(12) United States Patent
Obara et al.

(10) Patent No.: US 12,358,554 B2
(45) Date of Patent: Jul. 15, 2025

(54) ELECTRONIC CONTROL APPARATUS AND ITS FAULT DETECTION METHOD

(71) Applicant: HITACHI ASTEMO, LTD., Hitachinaka (JP)

(72) Inventors: Tadahiro Obara, Hitachinaka (JP); Yawara Kato, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 742 days.

(21) Appl. No.: 17/632,017

(22) PCT Filed: Aug. 5, 2020

(86) PCT No.: PCT/JP2020/030069
§ 371 (c)(1),
(2) Date: Feb. 1, 2022

(87) PCT Pub. No.: WO2021/025078
PCT Pub. Date: Feb. 11, 2021

(65) Prior Publication Data
US 2022/0274641 A1 Sep. 1, 2022

(30) Foreign Application Priority Data
Aug. 6, 2019 (JP) .................................. 2019-144814

(51) Int. Cl.
*B62D 5/04* (2006.01)
(52) U.S. Cl.
CPC ............. *B62D 5/0487* (2013.01); *B62D 5/04* (2013.01); *B62D 5/0409* (2013.01); *B62D 5/0484* (2013.01)
(58) Field of Classification Search
CPC ...... G01R 31/02; G01R 31/00; G01R 31/025; G01R 31/007; B62D 5/0487;
(Continued)

(56) References Cited

U.S. PATENT DOCUMENTS

| 2014/0334044 A1* | 11/2014 | Horihata ................ H02H 5/105 310/71 |
| 2019/0152524 A1 | 5/2019 | Fujita et al. |
| 2020/0158788 A1 | 5/2020 | Araki et al. |

FOREIGN PATENT DOCUMENTS

| JP | S54-078154 U | 6/1979 |
| JP | 2014-176215 A | 9/2014 |

(Continued)

OTHER PUBLICATIONS

International Search Report dated Nov. 2, 2020 issued in International Application No. PCT/JP2020/030069, with English translation, 6 pages.

(Continued)

*Primary Examiner* — Danny Nguyen
(74) *Attorney, Agent, or Firm* — FOLEY & LARDNER LLP

(57) ABSTRACT

An EPS control apparatus (2) having two electrical systems connected to external power supplies (6A, 6B) includes, in each electrical system, inverters (11A, 11B) driving a motor (1), control circuits (12A, 12B) controlling the inverters, and negative connectors (14A, 14B) connecting control system negative lines (18A, 18B) from a control system common ground (23) and drive system negative lines (17A, 17B) with negative power supply lines (62A, 62B). EPS control apparatus (2) also includes connection lines (25) connecting drive system negative lines (17A, 17B) and a current state detection circuit (24) detecting current states of connection lines (25). The control circuits detect open faults in connectors or negative power supply lines in their respective systems based on the current states. If an open fault is detected, the corresponding control circuit limits control on the inverter in its system. Otherwise, the control on the inverter in the system is continued.

8 Claims, 19 Drawing Sheets

(58) Field of Classification Search
CPC ... B62D 5/0409; B62D 5/0484; H02P 29/024; H02P 29/032
USPC .......................................................... 361/23
See application file for complete search history.

(56) References Cited

FOREIGN PATENT DOCUMENTS

| | | |
|---|---|---|
| JP | 2017-099170 A | 6/2017 |
| JP | 2017-191093 A | 10/2017 |
| WO | WO-2018/207319 A1 | 11/2018 |

OTHER PUBLICATIONS

International Preliminary Report on Patentability dated Feb. 17, 2022 issued in International Application No. PCT/JP2020/030069, with English translation, 13 pages.

\* cited by examiner

FIG.7

| FAILURE MODES | FIRST SWITCH ELEMENT | SECOND SWITCH ELEMENT | FIRST DETECTION SIGNAL INPUT VOLTAGE LEVEL | SECOND DETECTION SIGNAL INPUT VOLTAGE LEVEL |
|---|---|---|---|---|
| OPEN FAULT IN FIRST GND HARNESS | ON STATE | OFF STATE | HIGH → LOW | HIGH |
| OPEN FAULT IN SECOND GND HARNESS | OFF STATE | ON STATE | HIGH | HIGH → LOW |

ELECTRONIC CONTROL APPARATUS AND ITS FAULT DETECTION METHOD

TECHNICAL FIELD

The present invention relates to an electronic control apparatus having system redundancy and a fault detection method used in the electronic control apparatus.

BACKGROUND ART

There is an in-vehicle electronic control apparatus having system redundancy in an electric power steering (EPS) system or the like so that control processing is continuously performed in view of safety and reliability even when a fault or a failure occurs. For example, Patent Document 1 discusses a redundant configuration in which inverters are redundant and have two systems, to address sudden loss of assist associated with increased vehicle sizes or adoption of lane keeping assistance, for example. In this redundant configuration, two sets of multi-phase motor windings are used in a motor, and an inverter is connected to each of the two sets of multi-phase motor windings. In this way, if the inverter in one system malfunctions, the steering force can be continuously assisted by using the inverter in the other system to drive the motor.

In addition, electronic control apparatuses need to respond to high-level safety measures required for autonomous vehicle driving. For example, Patent Document 2 discusses an electronic control apparatus having a redundant configuration in which not only inverters but also control circuits that control the inverters are redundant and have two systems. This electronic control apparatus is connected to two external power supplies in the two redundant systems, and power is independently supplied from these external power supplies to the inverter and the control circuit for each system.

REFERENCE DOCUMENT LIST

Patent Documents

Patent Document 1: JP2014-176215 A
Patent Document 2: JP2017-191093 A

SUMMARY OF THE INVENTION

Problem to be Solved by the Invention

When inverters, control circuits, and external power supplies are redundant and have two systems, it is desirable, in view of the cost and size, that the current capacity of an individual harness for connecting a corresponding external power supply in a corresponding system to an electronic control apparatus be designed to be half of the current capacity of an individual harness in a non-redundant configuration.

However, if an open fault occurs in a ground harness connected to the ground of the external power supply in one system, a return current that is supposed to flow from the inverter to the external power supply in this system could flow to the normal ground harness in the other system via the common ground of the control circuits in the two systems. In this case, since the return currents from the inverters in the two systems are concentrated on the normal ground harness, a current exceeding the current capacity of the normal ground harness flows therethrough, and the normal ground harness is overheated. That is, a concurrent fault could occur. Since this concurrent fault results in simultaneous loss of current conduction through the motor in the two systems, "sudden loss of assist" occurs.

To prevent the flow of a return current via the common ground of the control circuits in the two systems, each of the control circuits in the two systems may be provided with a control system ground. However, in this way, the ground potentials could change differently from each other. Thus, since various kinds of information communications between the control circuits in the two systems need to be performed based on a differential signaling method, the cost may increase or the communication speed may deteriorate.

The present invention has been made in view of the above problem, and it is an object of the present invention to provide an electronic control apparatus that is compatible with systems in which inverters, control circuits, and external power supplies are redundant and the ground is commonly used for the redundant control circuits and that is capable of preventing a return current from flowing from one system in which the corresponding ground harness malfunctions to the normal ground harness in another system and to provide a fault detection method used in the electronic control apparatus.

Means for Solving the Problem

According to one aspect of the present invention, an electronic control apparatus having a plurality of electrical systems, each of which is connected to a different external power supply, includes: an inverter that is included in each of the electrical systems and that drives, among a plurality of separate winding sets of a motor, a predetermined winding set in the corresponding electrical system; a control circuit that is included in each of the electrical systems and that controls the inverter in the corresponding electrical system; a control system common ground to which the control circuits in the electrical systems are commonly connected; a connector that is included in each of the electrical systems and that connects a control system negative line from the control system common ground and a drive system negative line from a negative bus of the corresponding inverter with a negative power supply line from the corresponding external power supply; a connection line that mutually connects the drive system negative lines between the electrical systems; and a current state detection circuit that is installed on the connection line and that detects current states of the connection line, wherein, in each electrical system, the corresponding control circuit detects, based on the current state, whether an open fault has occurred in the corresponding connector or negative power supply line in the corresponding electrical system, and wherein, when the control circuit detects occurrence of the open fault, the control circuit limits control on the corresponding inverter in the corresponding electrical system, and when the control circuit does not detect occurrence of the open fault, the control circuit continues control on the corresponding inverter in the corresponding electrical system.

In addition, according to another aspect of the present invention, a fault detection method by an electronic control apparatus including: a plurality of electrical systems, each of which is connected to a different external power supply; an inverter that is included in each of the electrical systems and that drives, among a plurality of separate winding sets of a motor, a predetermined winding set in the corresponding electrical system; a control circuit that is included in each of the electrical systems and that controls the inverter in the corresponding electrical system; a control system common ground to which the control circuits in the electrical systems are commonly connected; a connector that is included in each of the electrical systems and that connects a control system negative line from the control system common ground and a drive system negative line from a negative bus of the corresponding inverter with a negative power supply line from the corresponding external power supply; a connection line that mutually connects the drive system negative lines between the electrical systems; and a current state detection circuit that is installed on the connection line and that detects current states of the connection line includes: causing the control circuit in each electrical system to detect, based on the current state, whether an open fault has occurred in the corresponding connector or negative power supply line in the corresponding electrical system; causing the control circuit to limit control on the corresponding inverter in the corresponding electrical system when the control circuit detects occurrence of the open fault; and causing the control circuit to continue control on the corresponding inverter in the corresponding electrical system when the control circuit does not detect occurrence of the open fault.

Effects of the Invention

According to an electronic control apparatus and its fault detection method, in systems in which inverters, control circuits, and external power supplies are redundant and a ground is commonly used for the redundant control circuits, since a fault in a ground harness can be detected, it is possible to prevent a return current from flowing from one system in which a ground harness malfunctions to a normal ground harness in another system.

BRIEF DESCRIPTION OF THE DRAWINGS

FIG. 7 illustrates a relationship between failure modes and detection signals of the EPS control apparatus.

MODE FOR CARRYING OUT THE INVENTION

Hereinafter, examples of the present invention will be described in detail with reference to the attached drawings.

First Example

Figure 1:
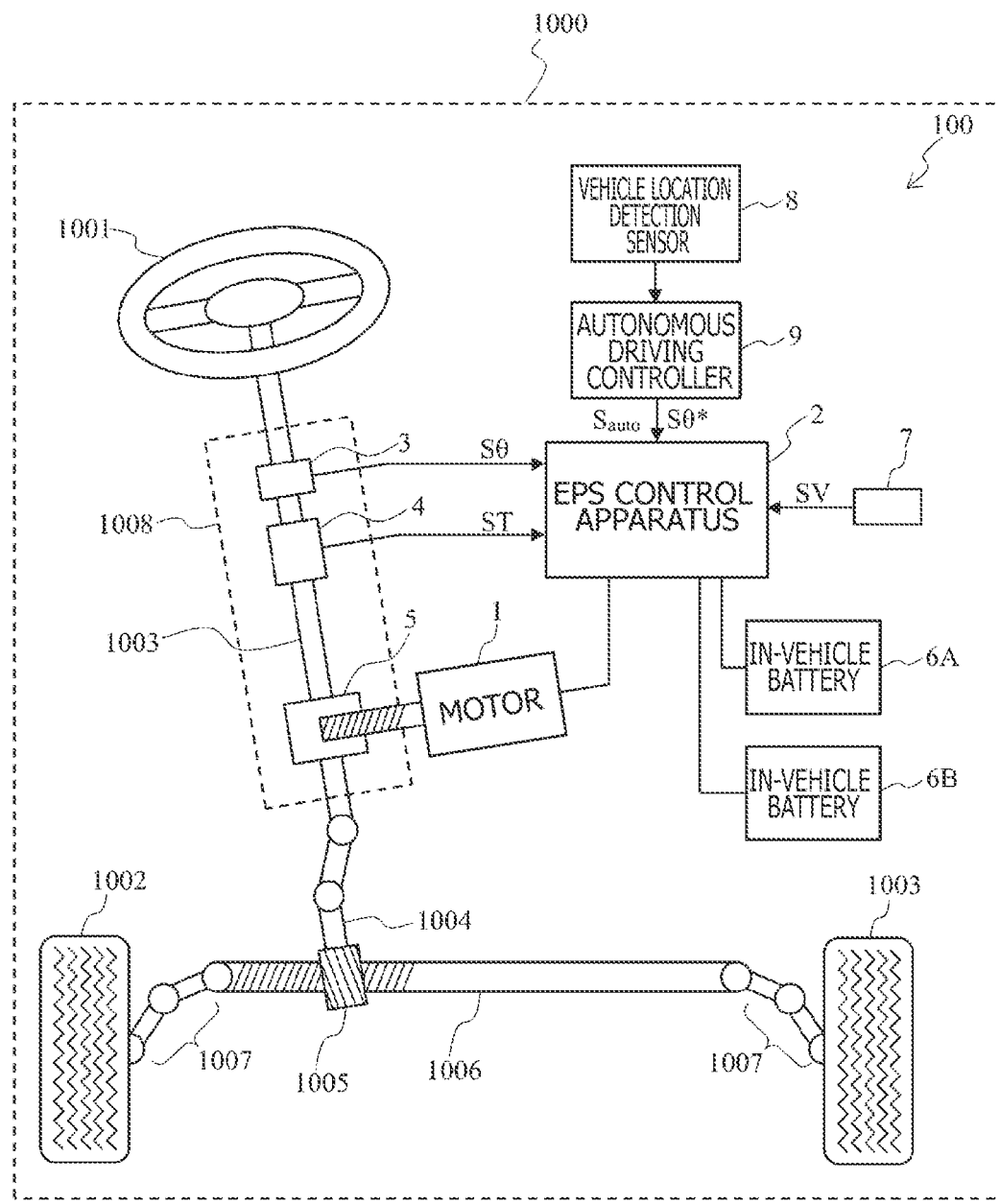
FIG. 1 is a schematic configuration diagram illustrating an example of an EPS system according to a first example.

FIG. 1 illustrates an example of an electric power steering (EPS) system according to a first example. An EPS system 100 is a system for assisting steering torque. Specifically, in normal driving in which a driver of a vehicle 1000 performs a steering operation and rotates a pair of controlled wheels 1002 with steering torque generated with a steering wheel 1001, EPS system 100 assists the steering torque. The steering torque generated by operating steering wheel 1001 is transmitted to a pinion gear 1005 connected to a pinion shaft 1004 via a steering shaft 1003, etc. The rotational motion of pinion gear 1005 based on the transmitted steering torque is converted into linear motion in the direction of the vehicle width by a rack gear 1006 that engages with pinion gear 1005, and a pair of steering mechanisms 1007 connected to rack gear 1006 operates with this linear motion. Thus, controlled wheels 1002 connected to their respective steering mechanisms 1007 rotate. EPS system 100 is configured to add assist torque, which assists the steering torque, to the transmission path of the steering torque to the pair of steering mechanisms 1007.

In the example illustrated in FIG. 1, EPS system 100 includes a motor 1 and an EPS control apparatus 2, which includes a computer and controls the driving of motor 1. In addition, EPS system 100 includes a steering column 1008 including, in addition to steering shaft 1003, a steering angle sensor 3, a steering torque sensor 4, and a reducer 5, which reduces the output of motor 1 and transmits the reduced output to steering shaft 1003.

EPS system 100 has a redundant configuration in which two electrical systems are used. Specifically, EPS system 100 has one electrical system in which power is supplied from a first in-vehicle battery (external power supply) 6A to motor 1 via EPS control apparatus 2 and the other electrical system in which power is supplied from a second in-vehicle battery (external power supply) 6B to motor 1 via EPS control apparatus 2. Hereinafter, in motor 1 and EPS control apparatus 2, the electrical system in which power is suppled from first in-vehicle battery 6A will be referred to as a "first electrical system", and "A" is included in a reference character that denotes an individual constituent element in the first electrical system. Likewise, in motor 1 and EPS control apparatus 2, the electrical system in which power is supplied from second in-vehicle battery 6B will be referred to as a "second electrical system", and "B" is included in a reference character that denotes an individual constituent element in the second electrical system.

EPS control apparatus 2 is configured to receive various kinds of signals such as a steering angle detection signal Sθ from steering angle sensor 3, a steering torque detection signal ST from steering torque sensor 4, and a vehicle velocity detection signal SV from a vehicle velocity sensor 7. In addition, EPS control apparatus 2 calculates a target assist torque value (a target torque) based on a steering angle, steering torque, vehicle velocity, etc. obtained from the received signals and controls the rotation of motor 1 so that the torque generated by motor 1 will come close to the target torque. Next, the torque generated by motor 1 is transmitted to steering shaft 1003 via reducer 5, and consequently, the steering force is assisted by the assist torque based on the operation state of vehicle 1000.

EPS system 100 further includes a vehicle location detection sensor 8 and an autonomous driving controller 9 for autonomous driving of vehicle 1000. For example, vehicle location detection sensor 8 is a camera or the like and is configured to detect the location of vehicle 1000. Autonomous driving controller 9 is configured to output an autonomous driving request signal Sauto when autonomous driving of vehicle 1000 is performed. In addition, autonomous driving controller 9 is configured to calculate a target steering angle of steering wheel 1001 based on the location detected by vehicle location detection sensor 8 and output a steering angle command signal Sθ* including information about the target steering angle. When receiving autonomous driving request signal Sauto, EPS control apparatus 2 calculates, based on a deviation between the target steering angle obtained from steering angle command signal Sθ* and an actual steering angle obtained from steering angle detection signal Sθ, a target steering torque value (a target torque). Next, EPS control apparatus 2 controls the rotation of motor 1 so that the actual steering torque obtained from steering torque detection signal ST will come close to the target torque. The torque generated by motor 1 is transmitted to steering shaft 1003 via reducer 5, and consequently, autonomous driving of vehicle 1000 is performed.

Figure 2:
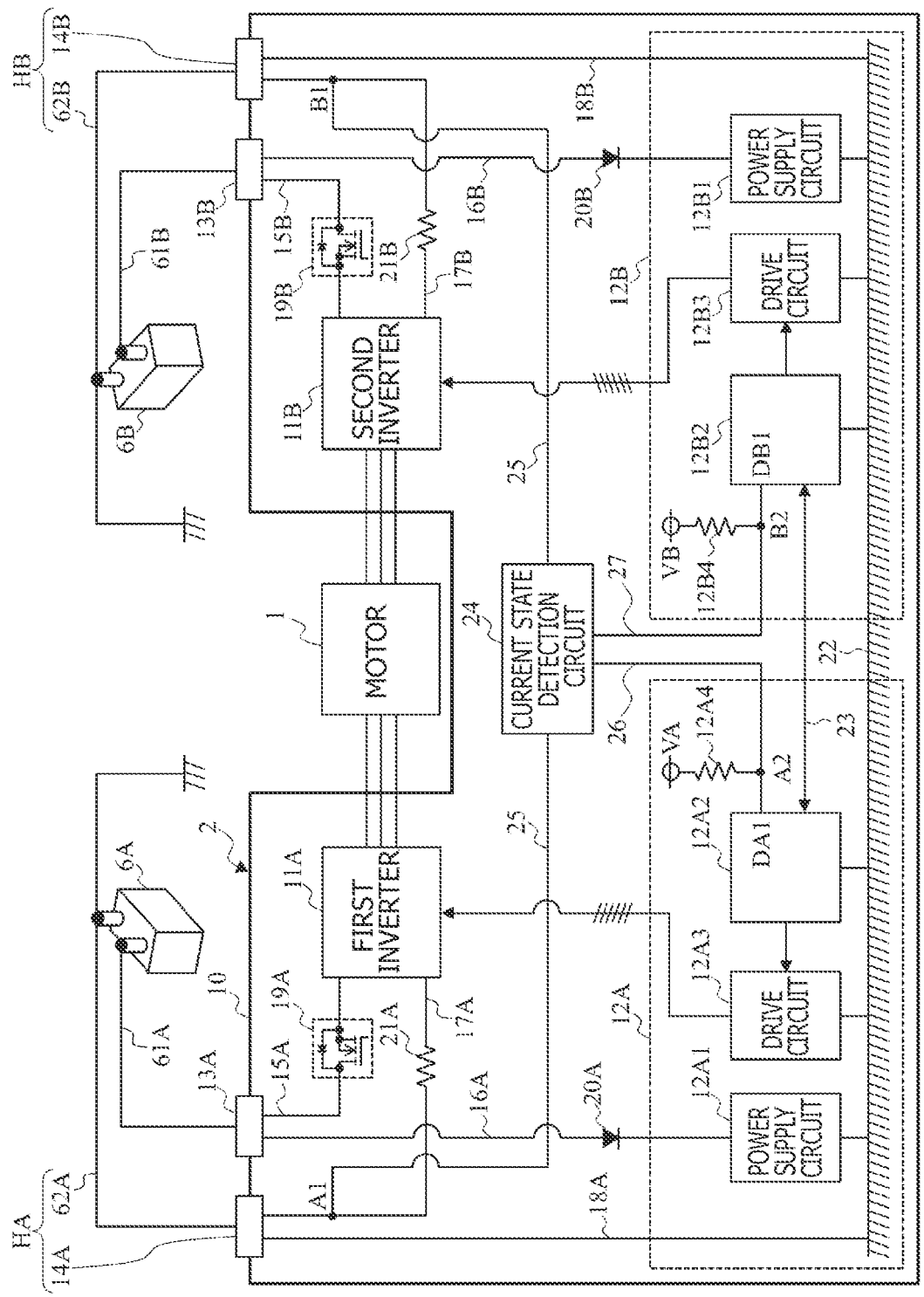
FIG. 2 is a circuit diagram illustrating an internal configuration example of an EPS control apparatus in the EPS system.

FIG. 2 illustrates an internal configuration example of EPS control apparatus 2 in EPS system 100. FIG. 2 illustrates only a configuration of EPS control apparatus 2 in EPS system 100 in FIG. 1, the configuration being used for normal driving (non-autonomous driving).

A housing 10 of EPS control apparatus 2 includes a first inverter 11A and a first control circuit 12A as the first electrical system in which first in-vehicle battery 6A is used as a power supply and includes a second inverter 11B and a second control circuit 12B as the second electrical system in which second in-vehicle battery 6B is used as a power supply. In addition, housing 10 includes a first positive connector 13A and a first negative connector 14A in the first electrical system and includes a second positive connector 13B and a second negative connector 14B in the second electrical system.

In the first electrical system, first positive connector 13A is connected to a positive electrode of first in-vehicle battery 6A via a first positive power supply line 61A, and first negative connector 14A is connected to a negative electrode of first in-vehicle battery 6A via a first negative power supply line 62A. Likewise, in the second electrical system, second positive connector 13B is connected to a positive electrode of second in-vehicle battery 6B via a second positive power supply line 61B, and second negative connector 14B is connected to a negative electrode of second in-vehicle battery 6B via a second negative power supply line 62B. Each of the two negative electrodes of first in-vehicle battery 6A and second in-vehicle battery 6B is connected to a power supply ground (body earth) of vehicle 1000. Hereinafter, the configuration formed by first negative connector 14A and first negative power supply line 62A will be referred to as a first ground (GND) harness HA, and the configuration formed by second negative connector 14B and second negative power supply line 62B will be referred to as a second ground (GND) harness HB.

In the first electrical system in EPS control apparatus 2, first positive connector 13A connected to first positive power supply line 61A is connected to a positive bus of first inverter 11A via a first drive system positive line 15A. In addition, in the first electrical system in EPS control apparatus 2, first positive connector 13A is connected to first control circuit 12A (specifically, a power supply circuit to be described below) via a first control system positive line 16A. Likewise, in the second electrical system in EPS control apparatus 2, second positive connector 13B connected to second positive power supply line 61B is connected to a positive bus of second inverter 11B via a second drive system positive line 15B. In addition, in the second electrical system in EPS control apparatus 2, second positive connector 13B is connected to second control circuit 12B (specifically, a power supply circuit to be described below) via a second control system positive line 16B.

In the first electrical system in EPS control apparatus 2, first negative connector 14A connected to first negative power supply line 62A is connected to a negative bus of first inverter 11A via a first drive system negative line 17A. In addition, first negative connector 14A is connected to first control circuit 12A (specifically, a control system common ground to be described below) via a first control system negative line 18A. That is, in EPS control apparatus 2, except for first negative connector 14A, first drive system negative line 17A and first control system negative line 18A are electrically separated from each other. Likewise, in the second electrical system in EPS control apparatus 2, second negative connector 14B connected to second negative power supply line 62B is connected to a negative bus of second inverter 11B via a second drive system negative line 17B. In addition, second negative connector 14B is connected to second control circuit 12B (specifically, the control system common ground to be described below) via a second control system negative line 18B. That is, in EPS control apparatus 2, except for second negative connector 14B, second drive system negative line 17B and second control system negative line 18B are electrically separated from each other.

Figure 3:
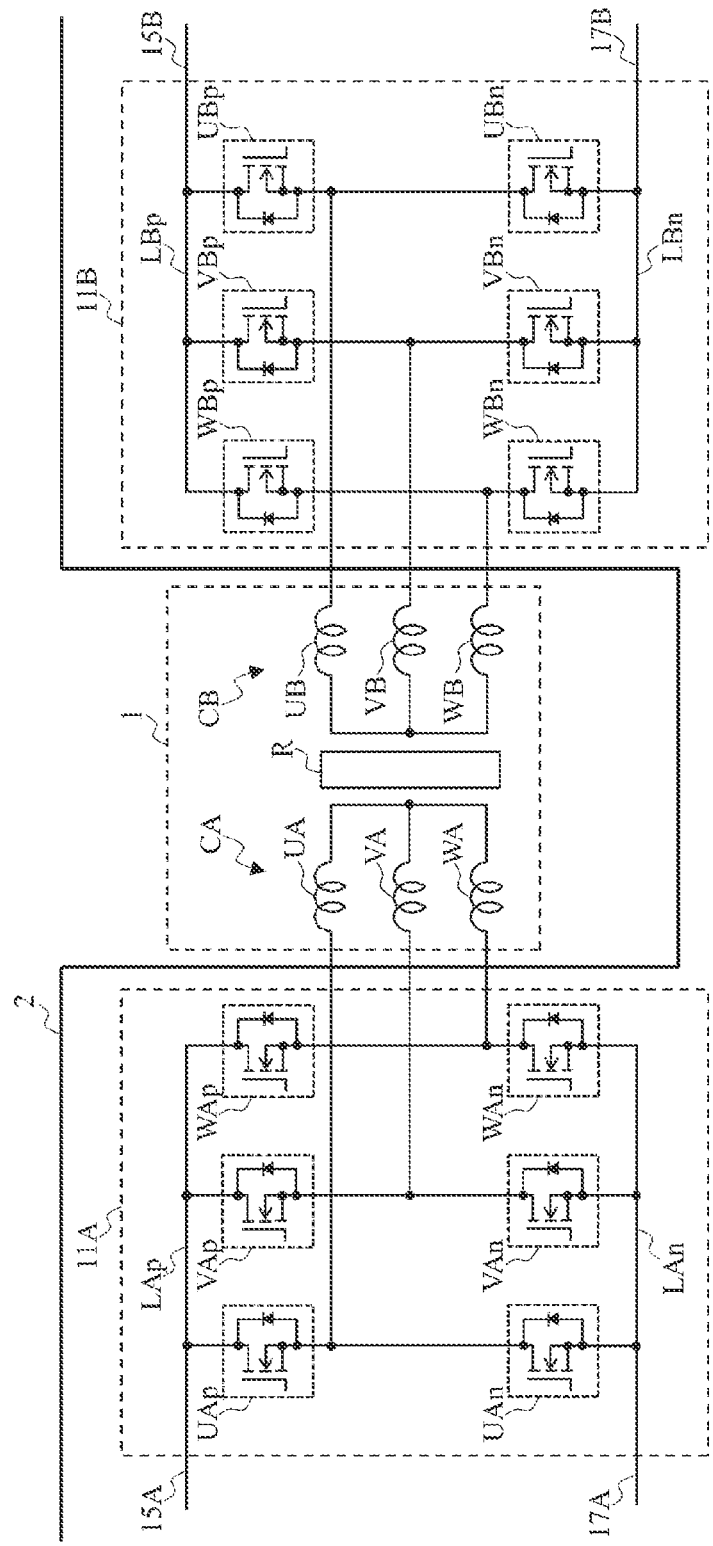
FIG. 3 is a circuit diagram illustrating an internal configuration example of inverters and a motor in the EPS control apparatus.

FIG. 3 illustrates an internal configuration example of motor 1 and first and second inverters 11A and 11B in EPS control apparatus 2. Motor 1 is a three-phase brushless motor and includes a cylindrical stator (not illustrated) including two separate winding sets, which are a first winding set CA and a second winding set CB, and a rotor R serving as a permanent magnet rotor rotatably installed in the middle part of the stator. First winding set CA is driven by first inverter 11A and is formed by three-phase windings in which a U-phase coil UA, a V-phase coil VA, and a W-phase coil WA are Y-connected. In addition, second winding set CB is driven by second inverter 11B and is formed by three-phase windings in which a U-phase coil UB, a V-phase coil VB, and a W-phase coil WB are Y-connected. First winding set CA and second winding set CB are insulated from each other, are wound around a stator, and share a magnetic circuit.

In first inverter 11A in the first electrical system, a U-phase arm, a V-phase arm, and a W-phase arm are connected in parallel between a positive bus LAp connected to first drive system positive line 15A and a negative bus LAn connected to first drive system negative line 17A. The U-phase arm is configured by connecting a switching element UAp of an upper arm and a switching element UAn of a lower arm in series. The V-phase arm is configured by connecting a switching element VAp of the upper arm and a switching element VAn of the lower arm in series. The W-phase arm is configured by connecting a switching element WAp of the upper arm and a switching element WAn of the lower arm in series. U-phase coil UA is connected to a node between two switching elements UAp and UAn of the U-phase arm. V-phase coil VA is connected to a node between two switching elements VAp and VAn of the V-phase arm. W-phase coil WA is connected to a node between two switching elements WAp and WAn of the W-phase arm. In this way, a node between two switching elements of the individual phase arms of first inverter 11A is connected to a corresponding phase coil of first winding set CA of motor 1, and a three-phase bridge circuit is consequently configured.

Likewise, in second inverter 11B in the second electrical system, a U-phase arm, a V-phase arm, and a W-phase arm are connected in parallel between a positive bus LBp connected to second drive system positive line 15B and a negative bus LBn connected to second drive system negative line 17B. The U-phase arm is configured by connecting a switching element UBp of an upper arm and a switching element UBn of a lower arm in series. The V-phase arm is configured by connecting a switching element VBp of the upper arm and a switching element VBn of the lower arm in series. The W-phase arm is configured by connecting a switching element WBp of the upper arm and a switching element WBn of the lower arm in series. U-phase coil UB is connected to a node between two switching elements UBp and UBn of the U-phase arm. V-phase coil VB is connected to a node between two switching elements VBp and VBn of the V-phase arm. W-phase coil WB is connected to a node between two switching elements WBp and WBn of the W-phase arm. In this way, a node between two switching elements of the individual phase arms of second inverter 11B is connected to a corresponding phase coil of second winding set CB of motor 1, and a three-phase bridge circuit is consequently configured.

Switching elements UAp, UAn, VAp, VAn, WAp, and WAn (which will be simply referred to as "UAp to WAn") in first inverter 11A and switching elements UBp, UBn, VBp, VBn, WBp, and WBn (which will be simply referred to as "UBp to WBn") in second inverter 11B each have an antiparallel freewheeling diode and are each an externally controllable power control semiconductor element. Examples of switching elements UAp to WAn and UBp to WBn include metal-oxide-semiconductor field-effect transistors (MOSFETs) and insulated gate bipolar transistors (IGBTs). In the example in FIG. 3, as switching elements UAp to WAn and UBp to WBn, n-channel MOSFETs are used. In consideration of the structure of a MOSFET, a parasitic diode formed by the pn junction between the source and the drain is used as the freewheeling diode.

Referring back to FIG. 2, in the first electrical system, a first power supply relay 19A is installed on first drive system positive line 15A. On and off of first power supply relay 19A is controlled based on an externally supplied control signal. When set to the on state, first power supply relay 19A supplies power from first in-vehicle battery 6A to first inverter 11A. When set to the off state, first power supply relay 19A cuts off the power from first in-vehicle battery 6A to first inverter 11A. In addition, a rectification diode 20A for controlling the current that flows from first control circuit 12A to first positive connector 13A is installed on first control system positive line 16A.

Likewise, in the second electrical system, a second power supply relay 19B is installed on second drive system positive line 15B. On and off of second power supply relay 19B is controlled based on an externally supplied control signal. When set to the on state, second power supply relay 19B supplies power from second in-vehicle battery 6B to second inverter 11B. When set to the off state, second power supply relay 19B cuts off the power from second in-vehicle battery 6B to second inverter 11B. In addition, a rectification diode 20B for controlling the current that flows from second control circuit 12B to second positive connector 13B is installed on second control system positive line 16B.

A first current detection element 21A for detecting a return current that returns from first inverter 11A to the negative electrode of first in-vehicle battery 6A is installed on first drive system negative line 17A, so as to detect a first motor current that flows through first winding set CA of motor 1. Likewise, a second current detection element 21B for detecting a return current that returns from second inverter 11B to the negative electrode of second in-vehicle battery 6B is installed on second drive system negative line 17B, so as to detect a second motor current that flows through second winding set CB of motor 1.

First control circuit 12A controls first inverter 11A in the first electrical system and includes a first power supply circuit 12A1, a first microcomputer 12A2, a first drive circuit 12A3, etc. In addition, second control circuit 12B controls second inverter 11B in the second electrical system and includes a second power supply circuit 12B1, a second microcomputer 12B2, a second drive circuit 12B3, etc.

The power supply voltage from first in-vehicle battery 6A is applied to first power supply circuit 12A1 via first control system positive line 16A. First power supply circuit 12A1 generates a first internal power supply voltage VA, which is, for example, 5 volts (V), and supplies this voltage VA to first microcomputer 12A2, first drive circuit 12A3, etc. In addition, the power supply voltage from second in-vehicle battery 6B is applied to second power supply circuit 12B1 via second control system positive line 16B. Second power supply circuit 12B1 generates a second internal power supply voltage VB, which is, for example, 5 V, and supplies this voltage VB to second microcomputer 12B2, second drive circuit 12B3, etc.

Each of first and second microcomputers 12A2 and 12B2 includes a processor such as a central processing unit (CPU), a non-volatile memory such as a read-only memory (ROM), a volatile memory such as a random access memory (RAM), and various kinds of input-output interfaces. After calculating a target torque as described above, each of first and second microcomputers 12A2 and 12B2 calculates a target motor current value (a target current value) based on the target torque. Each of second microcomputers 12A2 and 12B2 calculates a target current value in the corresponding system, based on the target current value and a predetermined output current ratio (for example, 50%:50%) between first inverter 11A and second inverter 11B. Hereinafter, the target current value in the first electrical system will be referred to as a first target current value, and the target current value in the second electrical system will be referred to as a second target current value.

First microcomputer 12A2 generates switching control signals for switching elements UAp to WAn in first inverter 11A based on PI control processing or the like so that the detected value of the first motor current detected by first current detection element 21A will come close to the first target current value. Likewise, second microcomputer 12B2 generates switching control signals for switching elements UBp to WBn in second inverter 11B based on PI control processing or the like so that the detected value of the second motor current detected by second current detection element 21B will come close to the second target current value. Examples of the switching control signals include pulse width modulation (PWM) signals.

First drive circuit 12A3 converts the switching control signals outputted from first microcomputer 12A2 into gate drive signals for driving switching elements UAp to WAn in first inverter 11A and outputs these gate drive signals. Likewise, second drive circuit 12B3 converts the switching control signals outputted from second microcomputer 12B2 into gate drive signals for driving switching elements UBp to WBn in second inverter 11B and outputs these gate drive signals.

First and second power supply circuits 12A1 and 12B1, first and second microcomputers 12A2 and 12B2, and first and second drive circuits 12A3 and 12B3 are each connected to a control system common ground 22 common to first control circuit 12A and second control circuit 12B. Control system common ground 22 is connected to first control system negative line 18A and second control system negative line 18B. In this way, control system common ground 22 is connected to the negative electrode of first in-vehicle battery 6A via first GND harness HA and to the negative electrode of second in-vehicle battery 6B via second GND harness HB.

First microcomputer 12A2 has a first abnormality diagnosis function for performing abnormality diagnosis on the first electrical system, and second microcomputer 12B2 has a second abnormality diagnosis function for performing abnormality diagnosis on the second electrical system. First microcomputer 12A2 and second microcomputer 12B2 communicate with each other via a communication line 23, to share abnormality information about the individual systems. When any one of the first electrical system and the second electrical system represents an abnormality, the power supply relay in the abnormal system is set to the off state, to cut off the power supply from the corresponding in-vehicle battery to the corresponding inverter. For example, when the first electrical system represents an abnormality, first microcomputer 12A2 outputs, to first power supply relay 19A, a relay control signal for cutting off the power supply from first in-vehicle battery 6A to first inverter 11A. In addition, first microcomputer 12A2 stops outputting the switching control signals to first drive circuit 12A3 so that first drive circuit 12A3 will not output the gate drive signals to switching elements UAp to WAn in first inverter 11A. When second electrical system represents an abnormality, second microcomputer 12B2 outputs, to second power supply relay 19B, a relay control signal for cutting off the power supply from second in-vehicle battery 6B to second inverter 11B. In addition, second microcomputer 12B2 stops outputting the switching control signals to second drive circuit 12B3 so that second drive circuit 12B3 will not output the gate drive signals to switching elements UBp to WBn in second inverter 11B.

As a part of the first abnormality diagnosis function or separately from the first abnormality diagnosis function, first microcomputer 12A2 performs first fault detection processing for detecting whether an open fault has occurred in first GND harness HA. In addition, as a part of the second abnormality diagnosis function or separately from the second abnormality diagnosis function, second microcomputer 12B2 performs second fault detection processing for detecting whether an open fault has occurred in second GND harness HB.

In addition, EPS control apparatus 2 includes a current state detection circuit 24 for enabling first microcomputer 12A2 to perform the first fault detection processing and for enabling second microcomputer 12B2 to perform the second fault detection processing.

Current state detection circuit 24 is a circuit for detecting the current state of the return current that flows from one system to the other system. Current state detection circuit 24 is installed on connection lines 25 connecting a connection node A1 on first drive system negative line 17A and a connection node B1 on second drive system negative line 17B. The locations of connection nodes A1 and B1 are not particularly limited. For example, connection node A1 may be located at or near first negative connector 14A, and connection node B1 may be located at or near second negative connector 14B. EPS control apparatus 2 is designed so that the impedance of individual connection line 25, on which current state detection circuit 24 is located, is higher than the impedances (resistance values) of first GND harness HA and second GND harness HB. In addition, the impedance (resistance value) of individual connection line 25 is designed to be lower than that of the following short circuit path to be described below that goes through control system common ground 22. These impedances can be designed, for example, by selecting the resistance values of the following resistors to be described below in current state detection circuit 24 or through pattern design conducted when the short circuit path and individual connection line 25 are reflected on a board.

Current state detection circuit 24 is connected to a digital input terminal DA1 of first microcomputer 12A2 via a signal line 26, and a first detection signal outputted by current state detection circuit 24 is inputted to first microcomputer 12A2. Likewise, current state detection circuit 24 is connected to a digital input terminal DB1 of second microcomputer 12B2 via a signal line 27, and a second detection signal outputted by current state detection circuit 24 is inputted to second microcomputer 12B2. A pull-up resistor 12A4, to which first internal power supply voltage VA from first power supply circuit 12A1 is applied, is connected to a connection node A2 of signal line 26. Likewise, a pull-up resistor 12B4, to which second internal power supply voltage VB from second power supply circuit 12B1 is applied, is connected to a connection node B2 of signal line 27. The voltage of the first detection signal inputted to first microcomputer 12A2 via signal line 26 matches the potential at connection node A2, and the voltage of the second detection signal inputted to second microcomputer 12B2 via signal line 27 matches the potential at connection node B2.

Hereinafter, why the first fault detection processing by first microcomputer 12A2, the second fault detection processing by second microcomputer 12B2, and current state detection circuit 24 that makes these kinds of processing possible are adopted by EPS control apparatus 2 will be described with reference to FIG. 19.

Figure 19:
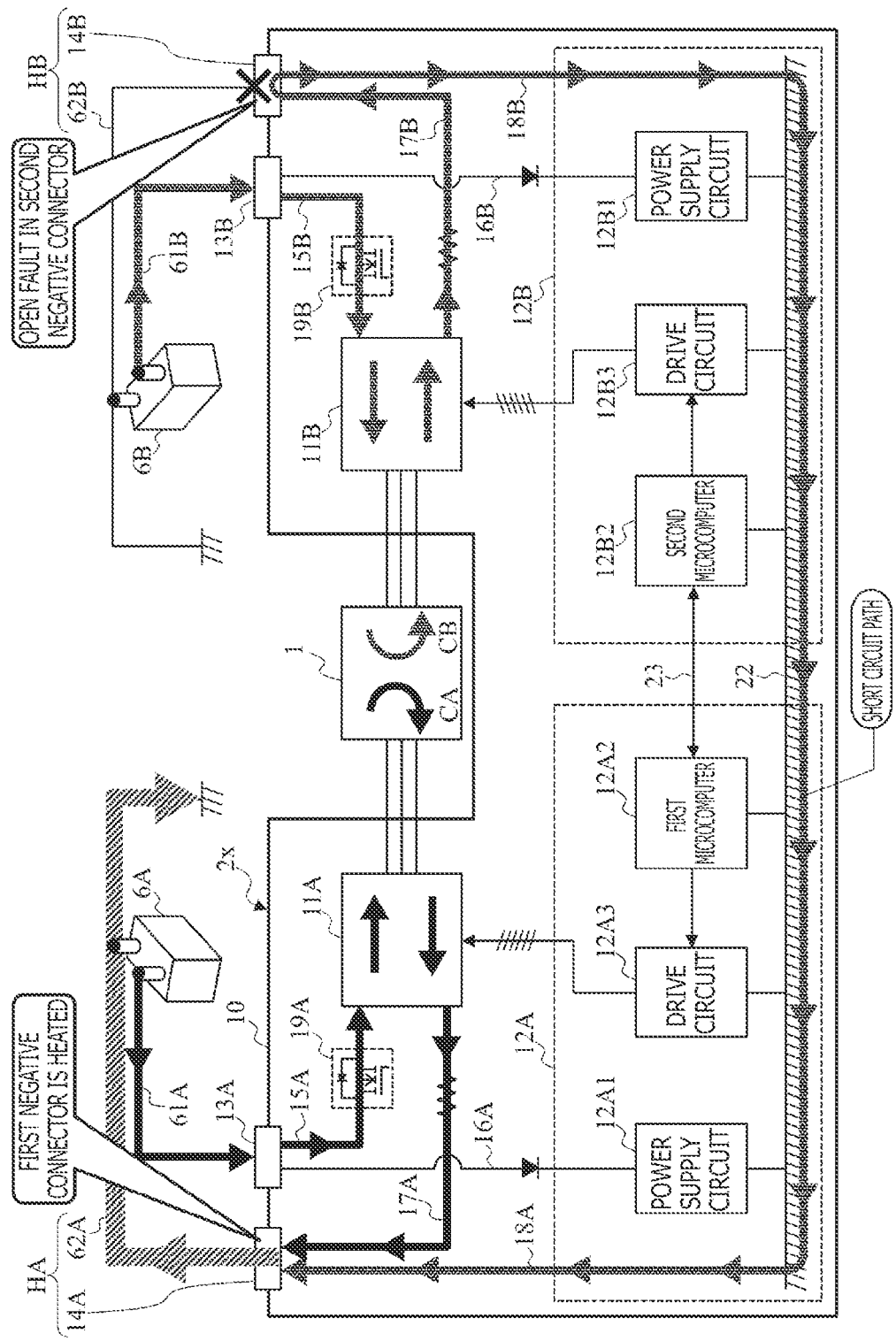
FIG. 19 is a circuit diagram illustrating an example of current flow when a concurrent fault has occurred.

FIG. 19 illustrates a current path that appears when an open fault has occurred in second GND harness HB of an EPS control apparatus 2x without current state detection circuit 24. EPS control apparatus 2x in FIG. 19 has the same configuration as that of EPS control apparatus 2, except for current state detection circuit 24, the following connection wirings to be described below, etc. Thus, the same components as those of EPS control apparatus 2 will be denoted by the same reference characters, and description thereof will be omitted.

In FIG. 19, a primary-side current is supplied from the positive electrode of first in-vehicle battery 6A to first inverter 11A, which supplies a current to first winding set CA of motor 1, via first positive power supply line 61A, first positive connector 13A, and first drive system positive line 15A. A return current that returns from first inverter 11A to the negative electrode of first in-vehicle battery 6A flows via first drive system negative line 17A. Likewise, a primary-side current is supplied from the positive electrode of second in-vehicle battery 6B to second inverter 11B, which supplies a current to second winding set CB of motor 1, via second positive power supply line 61B, second positive connector 13B, and second drive system positive line 15B. A return current that returns from second inverter 11B to the negative electrode of second in-vehicle battery 6B flows via second drive system negative line 17B.

The impedances of first and second GND harnesses HA and HB are normally designed to be lower than the impedance of a short circuit path by which first and second negative connectors 14A and 14B are short-circuited, the short circuit path being formed by first control system negative line 18A, control system common ground 22, and second control system negative line 18B. Thus, in the first electrical system, the return current that has flowed from first inverter 11A to first negative connector 14A does not flow through the above short circuit path but flows to the negative electrode (power supply ground) of first in-vehicle battery 6A via first GND harness HA. Likewise, in the second electrical system, the return current that has flowed from second inverter 11B to second negative connector 14B does not flow through the above short circuit path but flows to the negative electrode (power supply ground) of second in-vehicle battery 6B via second GND harness HB. However, when an open fault has occurred in any one of first GND harness HA and second GND harness HB, the return current flows through a different path.

If an open fault occurs in second GND harness HB (for example, second negative connector 14B) in the second electrical system, since the return current that has flowed from second inverter 11B to second negative connector 14B cannot flow through second GND harness HB, the current flows through the above short circuit path. This return current from second inverter 11B flows to first negative connector 14A via the above short circuit path and merges with the return current from first inverter 11A. The merged return current flows to the negative electrode (power supply ground) of first in-vehicle battery 6A via normal first GND harness HA. That is, the two return currents in the two systems, one return current in the first electrical system and the other return current in the second electrical system, are concentrated on normal first GND harness HA.

Since EPS system 100 has a redundant configuration of two electrical systems, only half of the primary-side current in a non-redundant configuration flows to the inverter in the individual system, and the return current is consequently halved. Thus, the current capacity of the GND harness in the individual system is set to half of the current capacity of a GND harness in a non-redundant configuration in view of the cost and size. However, as described above, if the return currents in the two systems of the first electrical system and the second electrical system are concentrated on normal first GND harness HA, a return current exceeding the current capacity of normal first GND harness HA flows through normal first GND harness HA, which is consequently overheated. As a result, a concurrent fault where both of first GND harness HA and second GND harness HB malfunction could occur. This concurrent fault could also occur when an open fault first occurs in first GND harness HA in the first electrical system.

To prevent such a return current from flowing through the above short circuit path, each of first and second control circuit 12A and 12B may be provided with a control system ground. In this case, however, the ground potentials could change differently from each other. Thus, a differential signaling method needs to be used for various kinds of information communications between first and second control circuits 12A and 12B. However, use of a differential signaling method increases the cost and deteriorates the communication speed.

Thus, to prevent the return current from flowing to the other system at occurrence of an open fault in one system while using control system common ground 22, EPS control apparatus 2 adopts the first fault detection processing, the second fault detection processing, and current state detection circuit 24 that makes these kinds of processing possible.

Figure 4:
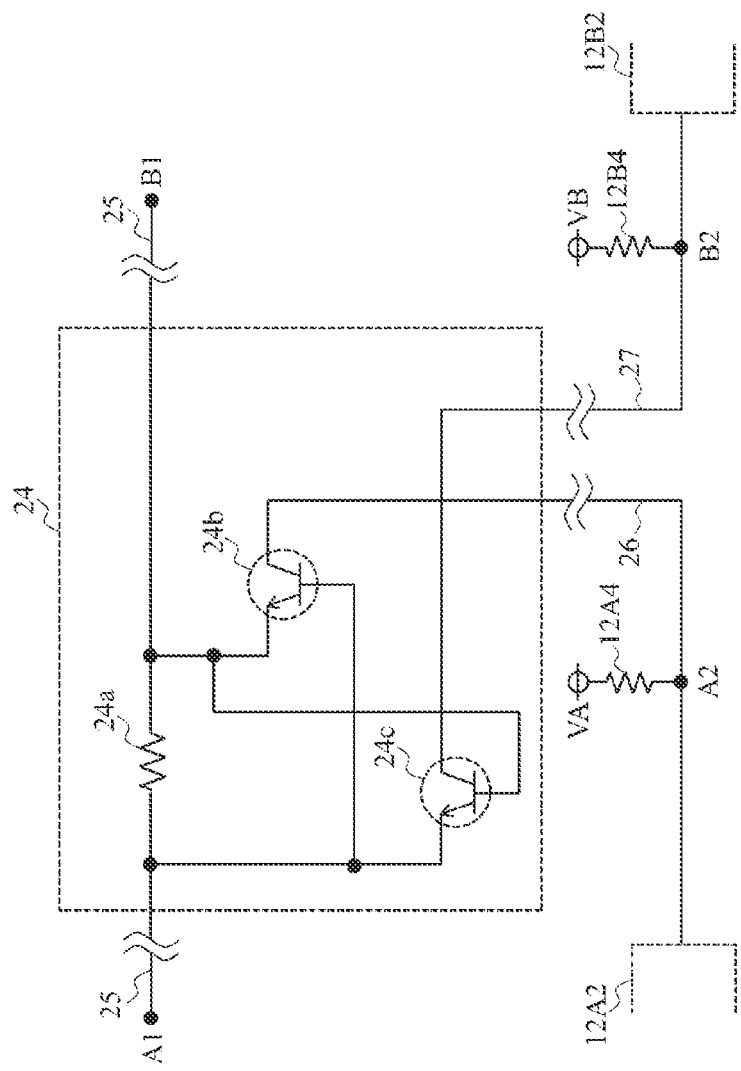
FIG. 4 is a circuit diagram illustrating an internal configuration example of a current state detection circuit in the EPS control apparatus.

FIG. 4 illustrates an internal configuration example of current state detection circuit 24. Current state detection circuit 24 includes a resistor 24a, a first switch element 24b, and a second switch element 24c. Resistor 24a is installed on individual connection line 25. One end of resistor 24a is connected to connection node A1 and the other end of resistor 24a is connected to connection node B1. First switch element 24b, which is an npn bipolar transistor, has an emitter terminal connected between resistor 24a and connection node B1 and has a base terminal connected between resistor 24a and connection node A1. In addition, second switch element 24c, which is an npn bipolar transistor, has an emitter terminal connected between resistor 24a and connection node A1 and has a base terminal connected between resistor 24a and connection node B1. First switch element 24b has a collector terminal connected to first microcomputer 12A2 via signal line 26 and connection node A2. In addition, second switch element 24c has a collector terminal connected to second microcomputer 12B2 via signal line 27 and connection node B2.

Current state detection circuit 24 operates as follows. When a current flows from connection node B1 to connection node A1 via individual connection line 25, due to a voltage drop, the potential at one end of resistor 24a on the side of connection node A1 becomes lower than the potential at the other end of resistor 24a on the side of connection node B1. The emitter potential of second switch element 24c consequently becomes lower than the base potential thereof. If the potential difference across resistor 24a that corresponds to the base-emitter voltage exceeds a threshold (junction saturation voltage), a current flows between the collector and the emitter (on state). As a result, a current flows from second power supply circuit 12B1 to connection line 25 via pull-up resistor 12B4 and second switch element 24c. Thus, due to a voltage drop of pull-up resistor 12B4, the potential at connection node B2 becomes less than second internal power supply voltage VB that has been applied before the current flows between the collector and the emitter of second switch element 24c. In this way, the flow of the return current from second inverter 11B to the first electrical system is detected. In contrast, since the emitter potential of first switch element 24b is higher than the base potential thereof, no base current flows. Thus, no current flows between the collector and the emitter (off state). Therefore, since no current flows from first power supply circuit 12A1 via pull-up resistor 12A4, the potential at connection node A2 does not change from first internal power supply voltage VA.

In contrast, when a current flows from connection node A1 to connection node B1 via individual connection line 25, due to a voltage drop, the potential at one end of resistor 24a on the side of connection node B1 becomes lower than the potential at the other end of resistor 24a on the side of connection node A1. The emitter potential of first switch element 24b consequently becomes lower than the base potential thereof. If the potential difference across resistor 24a that corresponds to the base-emitter voltage exceeds a threshold (junction saturation voltage), a current flows between the collector and the emitter (on state). As a result, a current flows from first power supply circuit 12A1 to connection line 25 via pull-up resistor 12A4 and first switch element 24b. Thus, due to a voltage drop of pull-up resistor 12A4, the potential at connection node A2 becomes less than first internal power supply voltage VA that has been applied before the current flows between the collector and the emitter of first switch element 24b. In this way, the flow of the return current from first inverter 11A to the second electrical system is detected. In contrast, since the emitter potential of second switch element 24c is higher than the base potential thereof, no base current flows. Thus, no current flows between the collector and the emitter (off state). Therefore, since no current flows from second power supply circuit 12B1 via pull-up resistor 12B4, the potential at connection node B2 does not change from second internal power supply voltage VB.

Figure 5:
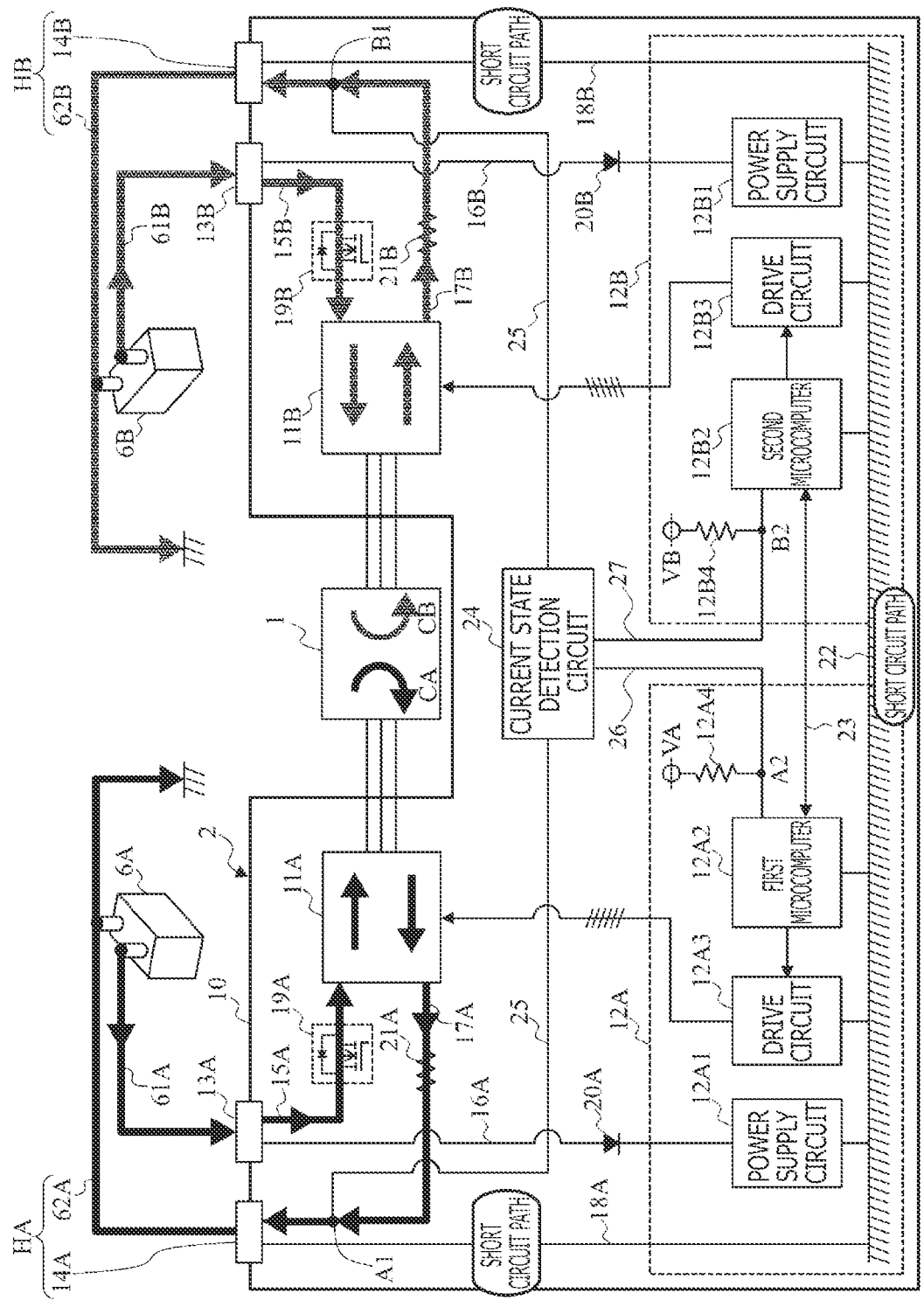
FIG. 5 is a circuit diagram illustrating a current path that appears when the EPS control apparatus is in a normal operation.

FIG. 5 illustrates a current path in a normal operation in which there is no open fault in first GND harness HA and second GND harness HB of EPS control apparatus 2. As described above, the impedance (resistance value) of individual connection line 25 is designed to be higher than those of first and second GND harnesses HA and HB and lower than that of the above short circuit path that goes through control system common ground 22. Thus, in a normal operation in which there is no open fault in first and second GND harnesses HA and HB, the return current from first inverter 11A flows through first GND harness HA. Likewise, the return current from second inverter 11B flows through second GND harness HB. That is, when first and second GND harnesses HA and HB operate normally, the return currents in the two systems do not easily flow through the above short circuit path and individual connection line 25.

Figure 6:
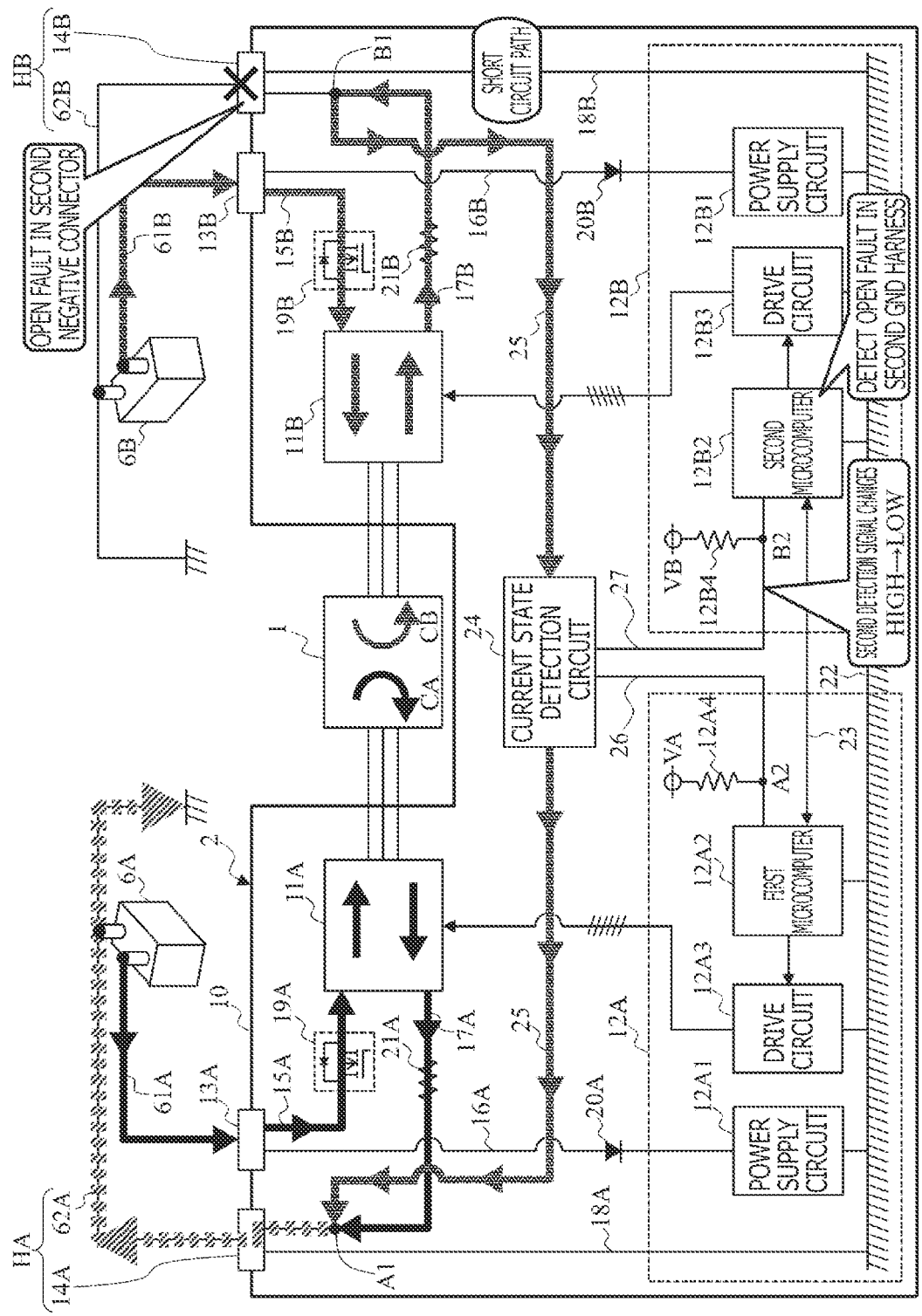
FIG. 6 is a circuit diagram illustrating a current path that appears when a fault has occurred in a GND harness of the EPS control apparatus.

FIG. 6 illustrates a current path that appears when an open fault has occurred in second GND harness HB of EPS control apparatus 2. If an open fault occurs in second GND harness HB (for example, second negative connector 14B) in the second electrical system, the return current from second inverter 11B flows from connection node B1 to connection node A1 via individual connection line 25. That is, the return current from second inverter 11B flows to the first electrical system via individual connection line 25, not via the short circuit path. Until second power supply relay 19B is set to the off state as described below, both of the return current from first inverter 11A and the return current from second inverter 11B flow through normal first GND harness HA in the first electrical system. That is, the return currents in the two systems of the first electrical system and the second electrical system are temporarily concentrated on first GND harness HA. While not illustrated, the current path that appears when an open fault has occurred in first GND harness HA is the same as the current path that appears when an open fault has occurred in second GND harness HB.

FIG. 7 illustrates a relationship among the failure modes of first and second GND harnesses HA and HB, the states of first and second switch elements 24b and 24c, and the states of the first and second detection signals. As illustrated in FIG. 6, when an open fault has occurred in second GND harness HB, the return current from second inverter 11B flows to the first electrical system via individual connection line 25. Thus, since the current flows from connection node B1 to connection node A1 via individual connection line 25, second switch element 24c in current state detection circuit 24 changes from the off state to the on state. Consequently, the input voltage level (corresponding to the potential at connection node B2) of the second detection signal inputted to second microcomputer 12B2 drops from a high potential state "HIGH" corresponding to second internal power supply voltage VB to a low potential state "LOW" corresponding to the ground potential. However, since first switch element 24b is maintained in the off state, the input voltage level (corresponding to the potential at connection node A2) of the first detection signal inputted to first microcomputer 12A2 does not change from a high potential state "HIGH" corresponding to first internal power supply voltage VA.

In contrast, when an open fault has occurred in first GND harness HA, the return current from first inverter 11A flows to the second electrical system via individual connection line 25 (this case is not illustrated). Thus, since the current flows from connection node A1 to connection node B1 via individual connection line 25, first switch element 24b in current state detection circuit 24 changes from the off state to the on state. Consequently, the input voltage level (corresponding to the potential at connection node A2) of the first detection signal inputted to first microcomputer 12A2 drops from high potential state "HIGH" corresponding to first internal power supply voltage VA to low potential state "LOW" corresponding to the ground potential. However, since second switch element 24c is maintained in the off state, the input voltage level (corresponding to the potential at connection node B2) of the second detection signal inputted to second microcomputer 12B2 does not change from high potential state "HIGH" corresponding to second internal power supply voltage VB.

When the input voltage level of the second detection signal changes from "HIGH" to "LOW", second microcomputer 12B2 detects that an open fault has occurred in second GND harness HB, as illustrated in FIG. 7. Second microcomputer 12B2 transmits second GND harness fault information indicating the detection of the occurrence of the open fault in second GND harness HB to first microcomputer 12A2 via communication line 23.

When the input voltage level of the first detection signal changes from "HIGH" to "LOW", first microcomputer 12A2 detects that an open fault has occurred in first GND harness HA, as illustrated in FIG. 7. First microcomputer 12A2 transmits first GND harness fault information indicating the detection of the occurrence of the open fault in first GND harness HA to second microcomputer 12B2 via communication line 23.

Figure 8:
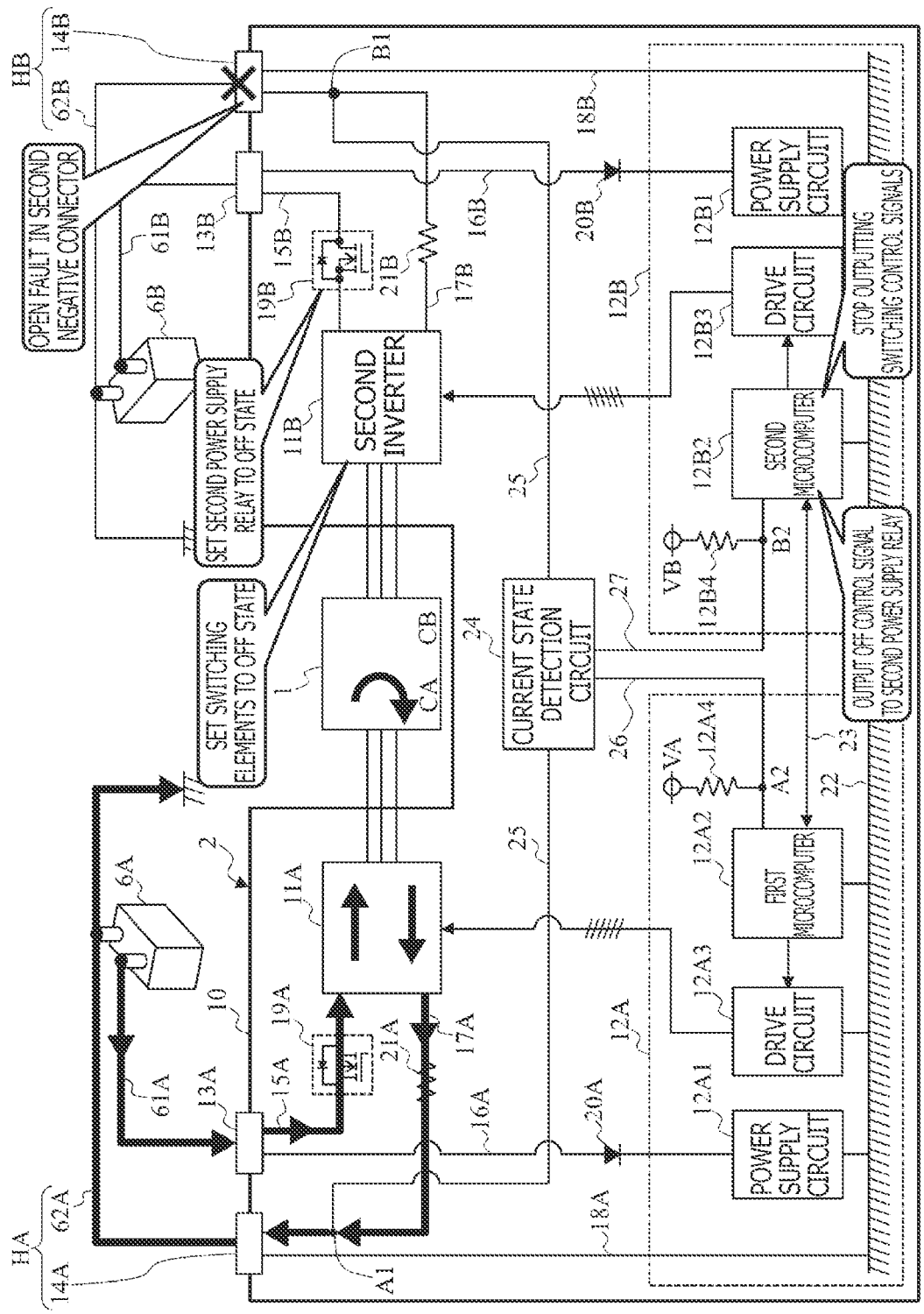
FIG. 8 is a circuit diagram illustrating a current path that appears after a fault is detected in a GND harness of the EPS control apparatus.

FIG. 8 illustrates a current path that appears after occurrence of an open fault in second GND harness HB of EPS control apparatus 2 is detected. When second microcomputer 12B2 detects that an open fault has occurred in second GND harness HB, second microcomputer 12B2 outputs a relay control signal (an off control signal) for setting second power supply relay 19B to the off state as fault processing. This fault processing consequently cuts off the return current that flows from second inverter 11B to normal first GND harness HA in the first electrical system via individual connection line 25 and causes only the return current from first inverter 11A to flow to normal first GND harness HA. In addition, second microcomputer 12B2 stops outputting the switching control signals to second drive circuit 12B3 as the fault processing. As a result, the output of the gate drive signals from second drive circuit 12B3 to second inverter 11B is stopped so that switching elements UBp to WBn will not perform unnecessary switching operations. While a case in which an open fault has occurred in first GND harness HA is not illustrated, a current path similar to the above current path appears.

When an open fault has occurred in second GND harness HB, the return currents in the two systems of the first electrical system and the second electrical system are temporarily concentrated on normal first GND harness HA (see FIG. 6). However, since only a very short time is needed between when the occurrence of the open fault in second GND harness HB is detected and when the return current in the second electrical system is cut off by setting second power supply relay 19B to the off state, it is possible to prevent normal first GND harness HA from being overheated. Likewise, when an open fault has occurred in first GND harness HA, it is possible to prevent normal second GND harness HB from being overheated.

Figure 9:
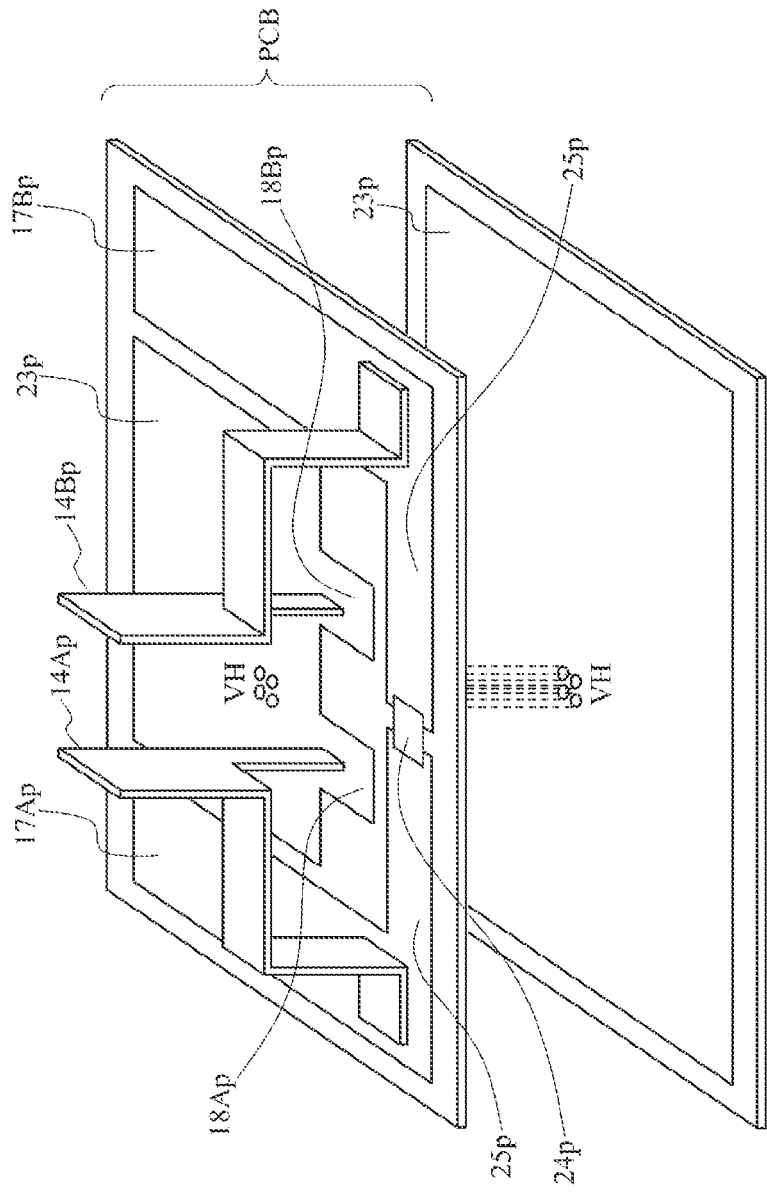
FIG. 9 is a perspective view of a configuration example of negative connectors.

FIG. 9 illustrates a configuration example of first and second negative connectors 14A and 14B of EPS control apparatus 2. EPS control apparatus 2 is configured by mounting various kinds of elements on a printed circuit board PCB and electrically connecting these elements with each other via conductive layers. As conductive layers corresponding to control system common ground 22, control system common ground layers 23p connected to each other via via-holes VH, etc. are formed on a mounting surface of printed circuit board PCB and an inner layer thereof. A first drive system ground layer 17Ap corresponding to first drive system negative line 17A and a second drive system ground layer 17Bp corresponding to second drive system negative line 17B are formed on the mounting surface of printed circuit board PCB. First drive system ground layer 17Ap and second drive system ground layer 17Bp sandwich a control system common ground layer 23p. A first protrusion portion 18Ap corresponding to first control system negative line 18A and a second protrusion portion 18Bp corresponding to second control system negative line 18B are formed to protrude from control system common ground layer 23p. An extension portion 25p that extends from first drive system ground layer 17Ap by first protrusion portion 18Ap is formed on the mounting surface of printed circuit board PCB as a conductive layer corresponding to connection line 25. Another extension portion 25p that extends from second drive system ground layer 17Bp by second protrusion portion 18Bp is formed on the mounting surface of printed circuit board PCB as a conductive layer corresponding to connection line 25. In addition, extension portion 25p extending from first drive system ground layer 17Ap and extension portion 25p extending from second drive system ground layer 17Bp are electrically connected to each other by a resistive layer 24p corresponding to resistor 24a in current state detection circuit 24.

Metal members 14Ap and 14Bp each extend in a staircase patter outwardly from the mounting surface of printed circuit board PCB. An end portion of each of metal members 14Ap and 14Bp is formed vertically from the mounting surface so that the end portion can function as a connection terminal of the corresponding one of first negative connectors 14A and 14B. A base portion of metal member 14Ap is divided into two parts, one part being electrically connected to first drive system ground layer 17Ap and the other part being electrically connected to first protrusion portion 18Ap of control system ground layer 23p. Likewise, a base portion of metal member 14Bp is divided into two parts, one part being electrically connected to second drive system ground layer 17Bp and the other part being electrically connected to second protrusion portion 18Bp of control system ground layer 23p. The end portion of each of metal members 14Ap and 14Bp fits with a counterpart connection terminal attached to an end portion of the corresponding one of first and second negative power supply lines 62A and 62B. Thus, first negative connector 14A includes metal member 14Ap and the counterpart connection terminal that fits with metal member 14Ap. Likewise, second negative connector 14B includes metal member 14Bp and the counterpart connection terminal that fits with metal member 14Bp.

Figure 10:
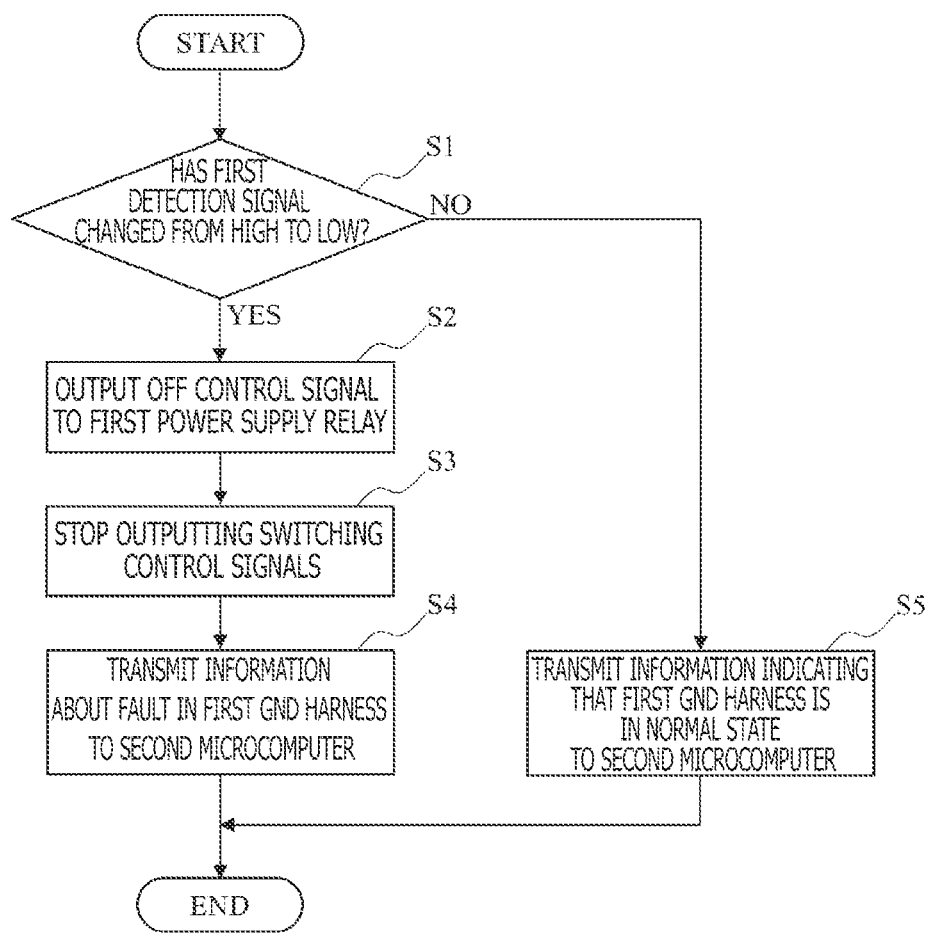
FIG. 10 is a flowchart illustrating an example of first fault detection processing performed by the EPS control apparatus.

FIG. 10 illustrates the first fault detection processing repeatedly performed by first microcomputer 12A2 when the ignition switch of vehicle 1000 is set to the on state and when the start of power supply to first microcomputer 12A2 is detected.

In step S1 (which is simply denoted as "S1" in FIG. 10 (the subsequent steps will also be denoted in the same way)), first microcomputer 12A2 determines whether the input voltage level of the first detection signal has changed from "HIGH" to "LOW". If first microcomputer 12A2 determines that the first detection signal has changed from "HIGH" to "LOW" (YES), first microcomputer 12A2 determines (detects) that an open fault has occurred in first GND harness HA and performs step S2. In contrast, if first microcomputer 12A2 determines that the first detection signal has not changed from "HIGH" to "LOW" (NO), first microcomputer 12A2 determines (detects) that first GND harness HA is in normal operation and performs step S5.

In step S2, as the fault processing for first GND harness HA, first microcomputer 12A2 outputs a relay control signal (an off control signal) to first power supply relay 19A to set first power supply relay 19A to the off state. This fault processing prevents the return current from first inverter 11A from flowing to normal second GND harness HB in the second electrical system via individual connection line 25 so that only the return current in the second electrical system will flow to normal second GND harness HB in the second electrical system.

In step S3, as the fault processing for first GND harness HA, first microcomputer 12A2 stops outputting the switching control signals to first drive circuit 12A3. The fault processing stops the output of the gate drive signals from first drive circuit 12A3 so that switching elements UAp to WAn in first inverter 11A will not perform unnecessary switching operations.

In step S4, first microcomputer 12A2 transmits information about the open fault in first GND harness HA to second microcomputer 12B2 via communication line 23. In this way, first microcomputer 12A2 and second microcomputer 12B2 share information about the open fault in first GND harness HA. In step S5, first microcomputer 12A2 transmits information indicating that first GND harness HA is in a normal state to second microcomputer 12B2 via communication line 23. In this way, first microcomputer 12A2 and second microcomputer 12B2 share information about a normal state of first GND harness.

Figure 11:
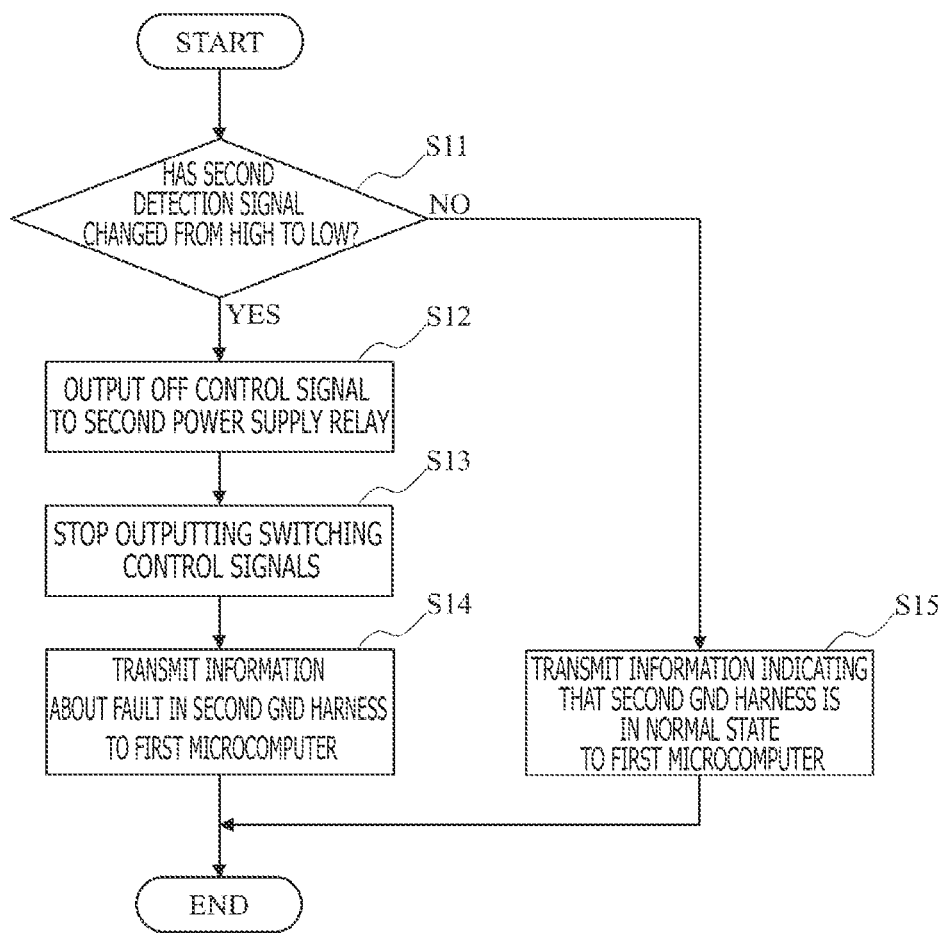
FIG. 11 is a flowchart illustrating an example of second fault detection processing performed by the EPS control apparatus.

FIG. 11 illustrates the second fault detection processing repeatedly performed by second microcomputer 12B2 when the ignition switch of vehicle 1000 is set to the on state and when the start of power supply to second microcomputer 12B2 is detected. Since the steps of the second fault detection processing are similar to those of the first fault detection processing, the second fault detection processing will be briefly described.

In step S11, as in the above step S1, second microcomputer 12B2 determines whether the second detection signal has changed. If second microcomputer 12B2 determines that the second detection signal has changed (YES), second microcomputer 12B2 determines (detects) that an open fault has occurred in second GND harness HB and performs step S12. In contrast, if second microcomputer 12B2 determines that the second detection signal has not changed (NO), second microcomputer 12B2 determines (detects) that second GND harness HB is in normal operation and performs step S15.

In step S12, as in the above step S2, as the fault processing for second GND harness HB, second microcomputer 12B2 outputs a relay control signal (an off control signal) to second power supply relay 19B to set second power supply relay 19B to the off state. In step S13, as in the above step S3, as the fault processing for second GND harness HB, second microcomputer 12B2 stops outputting the switching control signals to second drive circuit 12B3.

In step S14, as in the above step S4, second microcomputer 12B2 transmits information about the open fault in second GND harness HB to first microcomputer 12A2 via communication line 23. In step S15, as in the above step S5, second microcomputer 12B2 transmits information indicating that second GND harness HB is in a normal state to first microcomputer 12A2 via communication line 23.

In EPS system 100 including the inverters, the control circuits, and the external power supplies redundantly and a control system common ground 22, EPS control apparatus 2 according to the first example can prevent a return current from flowing from one system in which a corresponding GND harness malfunctions to the other system in which a corresponding GND harness is normal. Thus, even when the current capacity of the individual GND harness in this redundant configuration is reduced to half of that of the individual GND harness in a non-redundant configuration, the current that flows through a normal GND harness does not easily exceed the corresponding current capacity, and therefore, occurrence of a "concurrent fault" in which the normal GND harness is also overheated does not easily occur.

Figure 12:
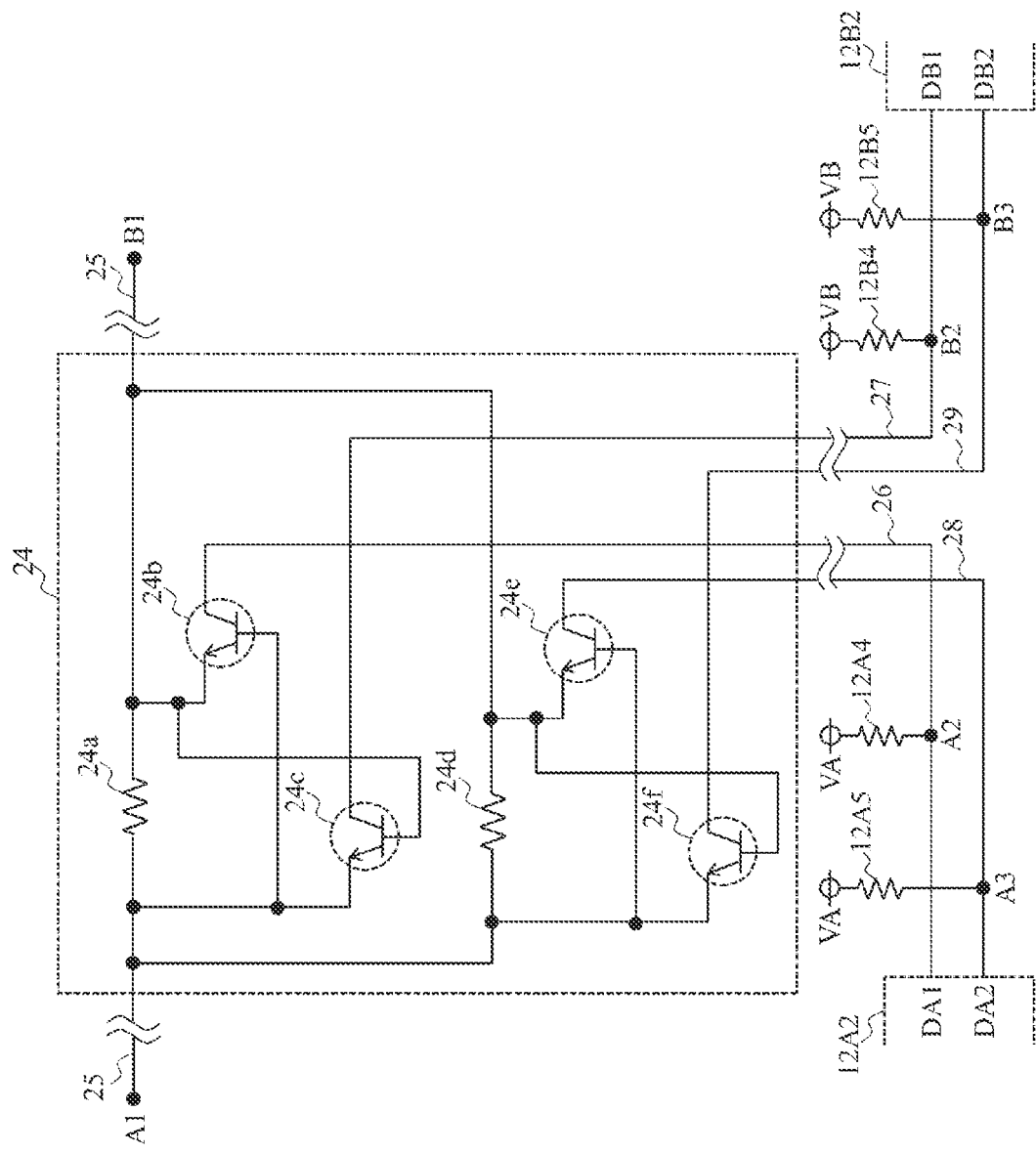
FIG. 12 is a circuit diagram illustrating a first variation of the current state detection circuit in the EPS control apparatus.

Next, a first variation of EPS control apparatus 2 will be described with reference to FIG. 12. In this variation of EPS control apparatus 2, a redundant configuration is adopted for constituent elements of current state detection circuit 24. That is, in addition to resistor 24a, first switch element 24b, and second switch element 24c described above, the present variation of current state detection circuit 24 further includes a resistor 24d, a third switch element 24e, and a fourth switch element 24f, which correspond to resistor 24a, first switch element 24b, and second switch element 24c, respectively.

Resistor 24d is connected in parallel to resistor 24a. As is the case with resistor 24a, one end of resistor 24d is connected to connection node A1 via individual connection line 25, and the other end of resistor 24d is connected to connection node B1. Third switch element 24e, which is an npn bipolar transistor, has an emitter terminal connected between resistor 24d and connection node B1 and has a base terminal connected between resistor 24d and connection node A1. In addition, fourth switch element 24f, which is an npn bipolar transistor, has an emitter terminal connected between resistor 24d and connection node A1 and has a base terminal connected between resistor 24d and connection node B1.

Third switch element 24e has a collector terminal connected to a digital input terminal DA2 of first microcomputer 12A2 via a signal line 28, and a third detection signal, which is the collector output of third switch element 24e, is inputted to first microcomputer 12A2. A pull-up resistor 12A5, to which first internal power supply voltage VA from first power supply circuit 12A1 is applied, is connected to signal line 28 at a connection node A3. Thus, the voltage of the third detection signal corresponds to the potential at connection node A3.

Fourth switch element 24f has a collector terminal connected to a digital input terminal DB2 of second microcomputer 12B2 via a signal line 29, and a fourth detection signal, which is the collector output of fourth switch element 24f, is inputted to second microcomputer 12B2. A pull-up resistor 12B5, to which second internal power supply voltage VB from second power supply circuit 12B1 is applied, is connected to signal line 29 at a connection node B3. Thus, the voltage of the fourth detection signal corresponds to the potential at connection node B3.

Based on the potential states of the first to fourth detection signals, first and second microcomputers 12A2 and 12B2 diagnose whether any one of first to fourth switch elements 24b, 24c, 24e, and 24f is fixedly on (a fault where any one of the switch elements does not change from the on state). This diagnosis is performed, assuming that normal first to fourth switch elements 24b, 24c, 24e, and 24f are in the off state. That is, the diagnosis of whether any one of first to fourth switch elements 24b, 24c, 24e, and 24f is fixedly on is performed in a situation where no return current flows from any one of first and second inverters 11A and 11B. For example, the diagnosis is performed before motor 1 is started. For example, first and second microcomputers 12A2 and 12B2 output relay control signals for setting first and second power supply relays 19A and 19B to the off state and output the switching control signals for setting the switching elements in first and second inverters 11A and 11B to the off state. If both the first and third detection signals represent "HIGH", first microcomputer 12A2 makes a diagnosis that first and third switch elements 24b and 24e are not fixedly on. Likewise, if both of second and fourth detection signals represent "HIGH", second microcomputer 12B2 makes a diagnosis that second and fourth switch elements 24c and 24f are not fixedly on.

Assuming that first microcomputer 12A2 has made a diagnosis that first and third switch elements 24b and 24e are not fixedly on, when at least one of the first and third detection signals changes to "LOW", first microcomputer 12A2 determines that an open fault has occurred in first GND harness HA. Likewise, assuming that second microcomputer 12B2 has made a diagnosis that second and fourth switch elements 24c and 24f are not fixedly on, when at least one of the second and fourth detection signals changes to "LOW", second microcomputer 12B2 determines that an open fault has occurred in second GND harness HB.

In contrast, if first microcomputer 12A2 makes a diagnosis that any one of first and third switch elements 24b and 24e is fixedly on, first microcomputer 12A2 operates as follows. That is, only when the detection signal corresponding to the switch element not fixedly on changes to "LOW", first microcomputer 12A2 determines that an open fault has occurred in first GND harness HA. Likewise, if second microcomputer 12B2 makes a diagnosis that any one of second and fourth switch elements 24c and 24f is fixedly on, second microcomputer 12B2 operates as follows. That is, only when the detection signal corresponding to the switch element not fixedly on changes to "LOW", second microcomputer 12B2 determines that an open fault has occurred in second GND harness HB.

In the first variation of EPS control apparatus 2, a redundant configuration is adopted for the individual constituent elements of current state detection circuit 24, to improve the reliability of current state detection circuit 24. Thus, even if an element malfunctions in one of the systems in current state detection circuit 24, each of first and second microcomputers 12A2 and 12B2 is able to perform its fault detection processing by using the detection signal outputted from the other system. Therefore, the reliability in detecting the occurrence of an open fault in a GND harness can be improved.

Figure 13:
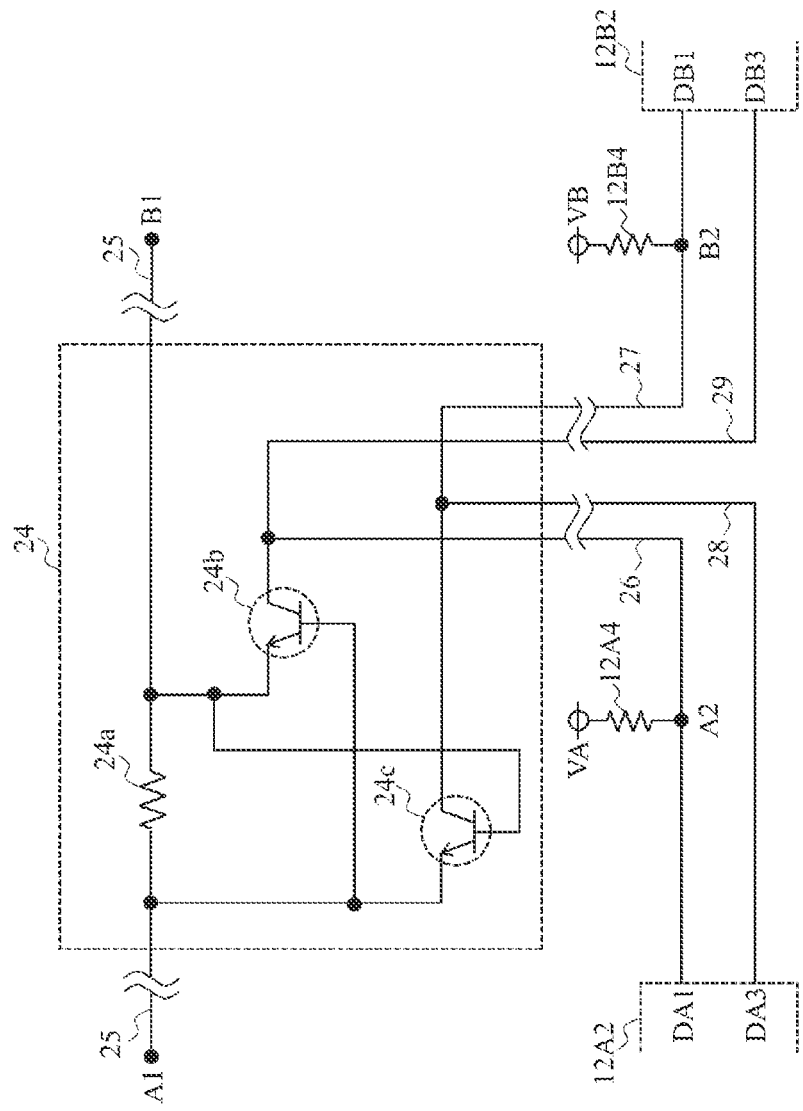
FIG. 13 is a circuit diagram illustrating a second variation of the current state detection circuit in the EPS control apparatus.

Next, a second variation of EPS control apparatus 2 will be described with reference to FIG. 13. In the second variation of EPS control apparatus 2, each of first and second microcomputers 12A2 and 12B2 receives both of first and second detection signals outputted from current state detection circuit 24.

Specifically, the collector terminal of second switch element 24c is connected not only to digital input terminal DB1 of second microcomputer 12B2 via signal line 27 but also to a digital input terminal DA3 of first microcomputer 12A2 via signal line 28. Thus, the second detection signal, which is the output of the collector terminal of second switch element 24c, is inputted not only to second microcomputer 12B2 but also to first microcomputer 12A2. In addition, the collector terminal of first switch element 24b is connected not only to digital input terminal DA1 of first microcomputer 12A2 via signal line 26 but also to a digital input terminal DB3 of second microcomputer 12B2 via signal line 29. Thus, the first detection signal, which is the output of the collector terminal of first switch element 24b, is inputted not only to first microcomputer 12A2 but also to second microcomputer 12B2.

In the second variation of EPS control apparatus 2, first microcomputer 12A2 can detect not only the occurrence of an open fault in first GND harness HA but also the occurrence of an open fault in second GND harness HB. In addition, second microcomputer 12B2 can detect not only the occurrence of an open fault in second GND harness HB but also the occurrence of an open fault in first GND harness HA. Thus, when any one of first and second microcomputers 12A2 and 12B2 detects the occurrence of an open fault in the GND harness in its own system, this microcomputer 12A2 or 12B2 does not need to transmit information about the fault to the other system via communication line 23.

In the second variation of EPS control apparatus 2, a pull-up resistor, to which the internal power supply voltage generated by the power supply circuit in its own system is applied, may be connected to a signal line for detecting an open fault in the GND harness in the other system. That is, a pull-up resistor, to which first internal power supply voltage VA from first power supply circuit 12A1 is applied, may be connected to signal line 28, and a pull-up resistor, to which second internal power supply voltage VB from second power supply circuit 12B1 is applied, may be connected to signal line 29. In this way, even when a failure occurs in the power supply circuit in one system, the other system can detect whether a fault has occurred in the GND harness in that system.

Second Example

Figure 14:
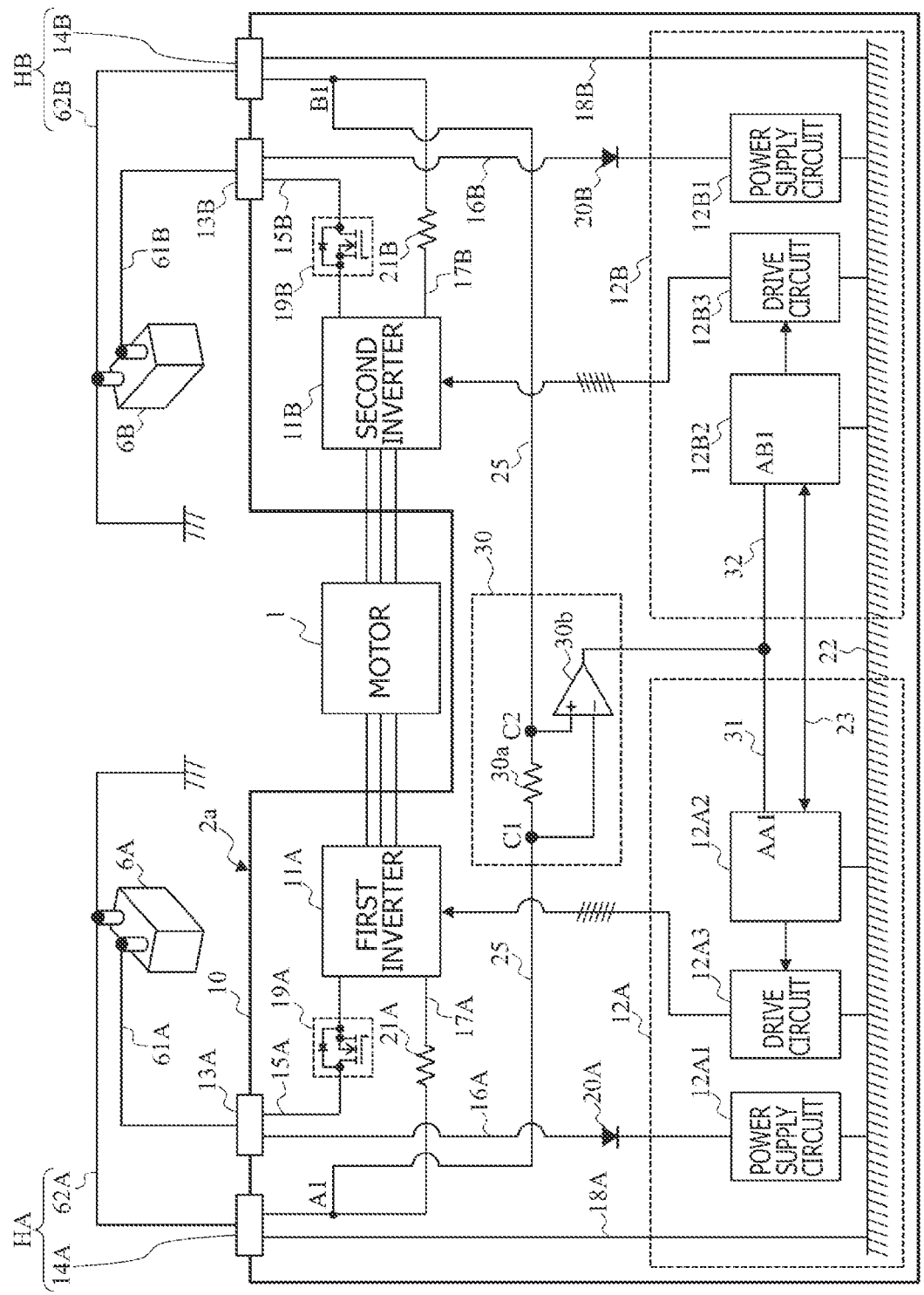
FIG. 14 is a circuit diagram illustrating an internal configuration example of an EPS control apparatus according to a second example.

FIG. 14 illustrates an internal configuration example of an EPS control apparatus 2a according to a second example. EPS control apparatus 2a in FIG. 14 differs from EPS control apparatus 2 in FIG. 2 in that a current state detection circuit 30 is used in place of current state detection circuit 24, so as to detect whether a fault has occurred in a GND harness based on a current detection value detected by current state detection circuit 30.

Current state detection circuit 30 includes a shunt resistor 30a and an amplifier 20b. Shunt resistor 30a is installed on an individual connection line 25, as potential difference generation means for generating a potential difference based on a current that flows through connection line 25, and connection nodes C1 and C2 located on both ends of shunt resistor 30a are connected to amplifier 30b. Amplifier 30b is potential difference amplification means for amplifying and outputting the potential difference across shunt resistor 30a. For example, amplifier 30b is an operational amplifier having a non-inverting input terminal (+), an inverting input terminal (−), and an output terminal, as illustrated in FIG. 14. In the case of the example in FIG. 14, the non-inverting input terminal (+) of amplifier 30b is connected to connection node C2, and the inverting input terminal (−) of amplifier 30b is connected to connection node C1. In addition, the output terminal of amplifier 30b is connected to an analog input terminal AA1 of first microcomputer 12A2 via a signal line 31, and the output voltage (current detection signal) of amplifier 30b is inputted to first microcomputer 12A2. In addition, the output terminal of amplifier 30b is connected to an analog input terminal AB1 of second microcomputer 12B2 via a signal line 32, and the output voltage (current detection signal) of amplifier 30b is inputted to second microcomputer 12B2. The impedance of individual connection line 25 on which current state detection circuit 30 is installed is also designed to be higher than the impedance of first GND harness HA and second GND harness HB and lower than the impedance of the short circuit path.

Current state detection circuit 30 operates as follows. When a current flows from connection node B1 to connection node A1 via individual connection line 25, due to a voltage drop of shunt resistor 30a, the potential at connection node C1 becomes lower than the potential at connection node C2. Since the input voltage of the non-inverting input terminal (+) of amplifier 30b becomes higher than the input voltage of the inverting input terminal (−), the output voltage of amplifier 30b becomes a positive voltage whose potential level continuously changes depending on the magnitude of the current. In contrast, when a current flows from connection node A1 to connection node B1 through connection line 25, due to a voltage drop of shunt resistor 30a, the potential at connection node C2 becomes lower than the potential at connection node C1. Since the input voltage of the non-inverting input terminal (+) of amplifier 30b becomes lower than the input voltage of the inverting input terminal (−), the output voltage of amplifier 30b becomes a negative voltage whose potential level continuously changes depending on the magnitude of the current.

First microcomputer 12A2 uses its internal analog/digital (A/D) converter to convert the output voltage of amplifier 30b, the output voltage being an analog signal, into digital data and to acquire a current detection value I of the current that flows through connection line 25. Likewise, second microcomputer 12B2 uses its internal A/D converter to convert the output voltage of amplifier 30b, the output voltage being an analog signal, into digital data and to acquire current detection value I of the current that flows through connection line 25. When the output voltage of amplifier 30b is a positive voltage, current detection value I is obtained as a positive value. When the output voltage of amplifier 30b is a negative voltage, current detection value I is obtained as a negative value. When current detection value I is a positive value, since the current flows from connection node B1 to connection node A1 through connection line 25, each of first and second microcomputers 12A2 and 12B2 determines that a return current from second inverter 11B is flowing to the first electrical system. In contrast, when current detection value I is a negative value, since the current flows from connection node A1 to connection node B1 through connection line 25, each of first and second microcomputers 12A2 and 12B2 determines that a return current from first inverter 11A is flowing to the second electrical system.

Figure 15:
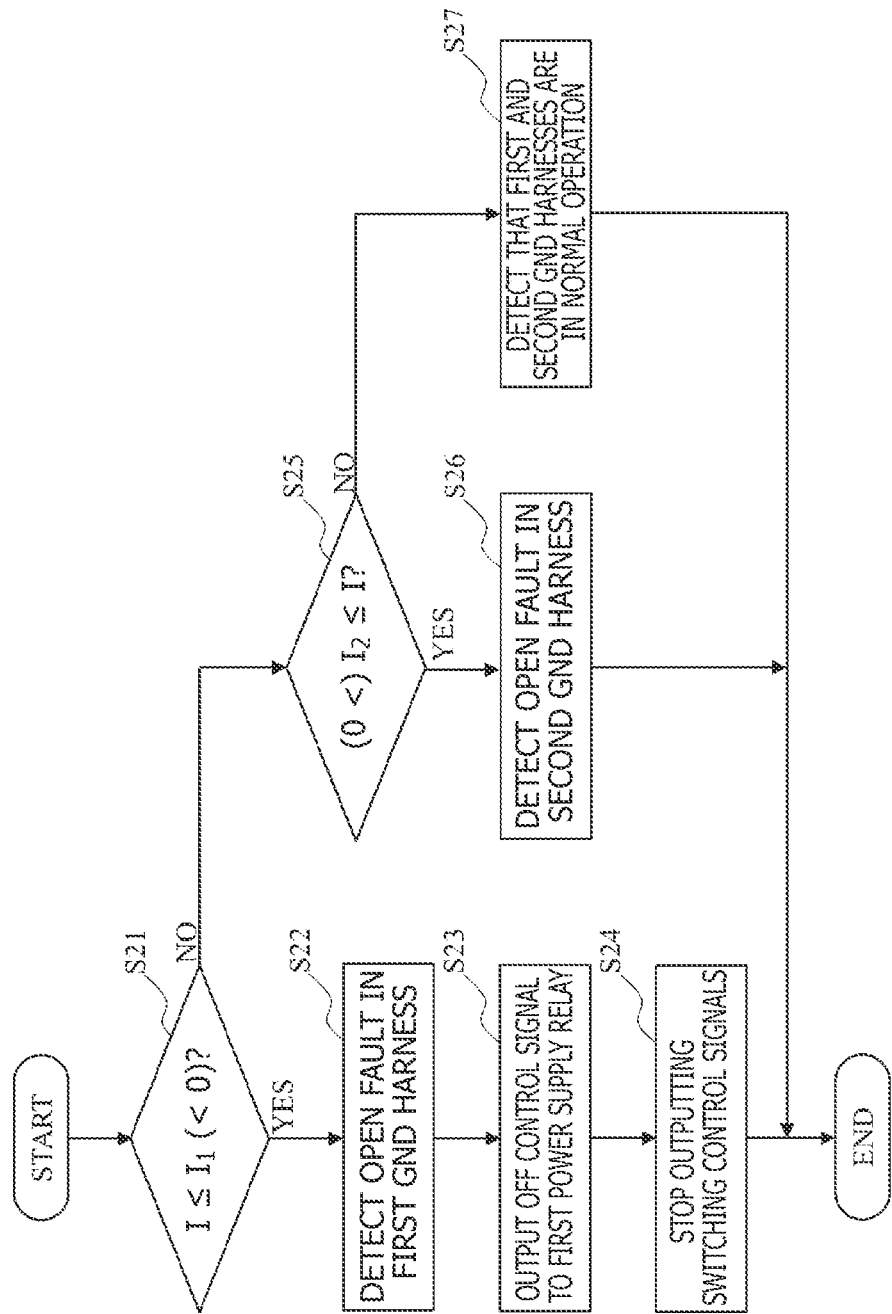
FIG. 15 is a flowchart illustrating an example of first fault detection processing performed by the EPS control apparatus.

FIG. 15 illustrates first fault detection processing repeatedly performed by first microcomputer 12A2 at predetermined time intervals Δt when the ignition switch of a vehicle 1000 is set to the on state and when the start of power supply to first microcomputer 12A2 is detected.

In step S21, first microcomputer 12A2 determines whether current detection value I is less than or equal to a predetermined negative value $I_1$ (<0). Predetermined negative value $I_1$ is a maximum value of the current assumed to flow from connection node A1 to connection node B1 through individual connection line 25 when an open fault has occurred in first GND harness HA. If first microcomputer 12A2 determines that current detection value I is less than or equal to predetermined negative value $I_1$ (YES), first microcomputer 12A2 performs step S22. In step S22, first microcomputer 12A2 determines (detects) that an open fault has occurred in first GND harness HA. In contrast, if first microcomputer 12A2 determines that current detection value I is more than predetermined negative value $I_1$ (NO), first microcomputer 12A2 performs step S25.

In step S23, as in the above step S2, first microcomputer 12A2 outputs, to first power supply relay 19A, a relay control signal (off control signal) for setting first power supply relay 19A to the off state, as the fault processing for first GND harness HA. Next, in step S24, as in the above step S3, first microcomputer 12A2 stops outputting the switching control signals to first drive circuit 12A3, as the fault processing for first GND harness HA.

In step S25, first microcomputer 12A2 determines whether current detection value I is more than or equal to a predetermined positive value $I_2$ (>0). Predetermined positive value $I_2$ is a minimum value of the current assumed to flow from connection node B1 to connection node A1 through individual connection line 25 when an open fault has occurred in second GND harness HB. When the first electrical system and the second electrical system have equal electrical characteristics, predetermined positive and negative values $I_2$ and $I_1$ may be designed to have the same absolute value.

In step S25, if first microcomputer 12A2 determines that current detection value I is more than or equal to predetermined positive value $I_2$ (YES), first microcomputer 12A2 performs step S26. In step S26, first microcomputer 12A2 determines (detects) that an open fault has occurred in second GND harness HB. In contrast, if first microcomputer 12A2 determines that current detection value I is less than predetermined positive value $I_2$ (NO), first microcomputer 12A2 performs step S27. In step S27, first microcomputer 12A2 determines (detects) that first and second GND harnesses HA and HB are in normal operation.

Figure 16:
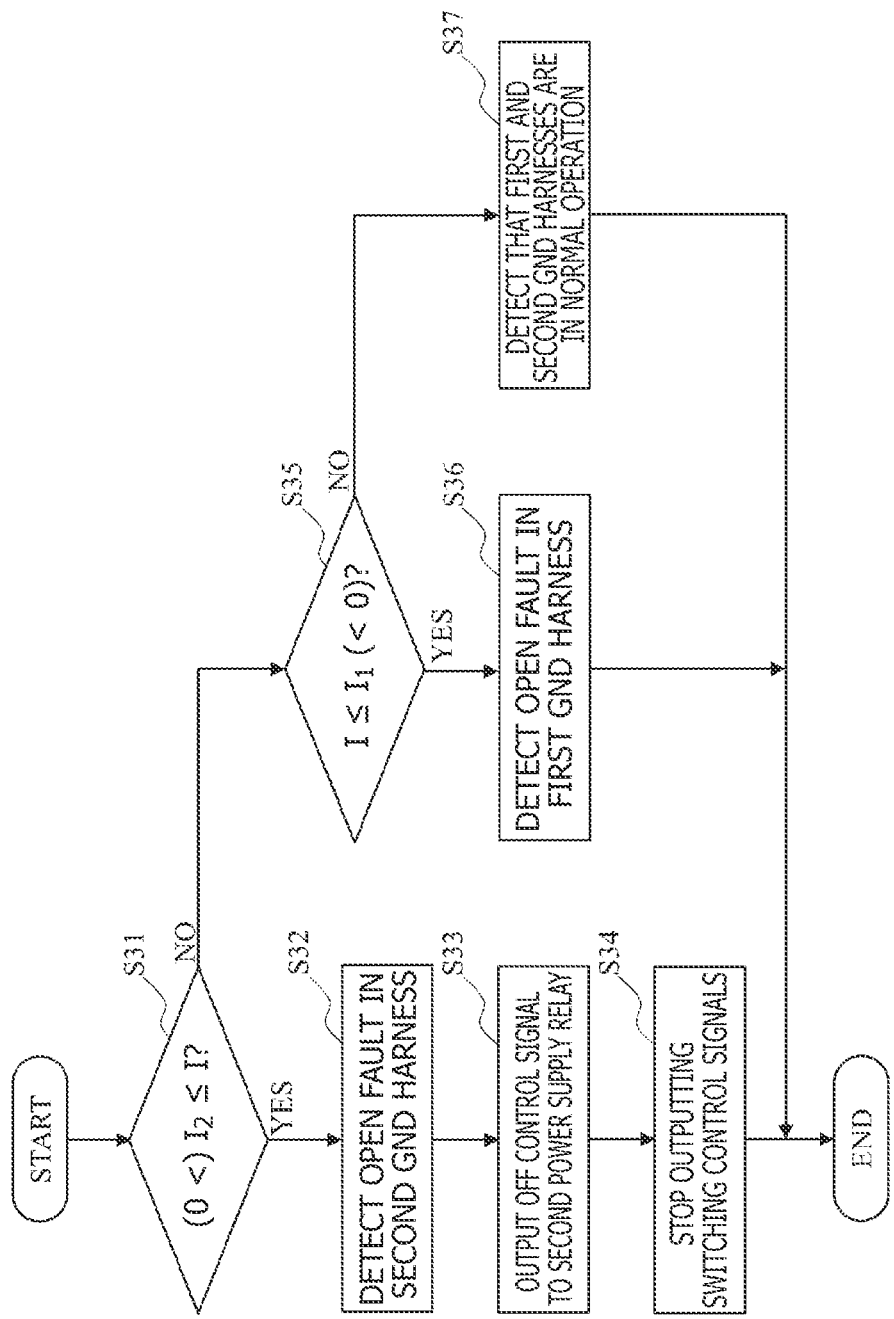
FIG. 16 is a flowchart illustrating an example of second fault detection processing performed by the EPS control apparatus.

FIG. 16 illustrates second fault detection processing repeatedly performed by second microcomputer 12B2 at predetermined time intervals Δt when the ignition switch of vehicle 1000 is set to the on state and when the start of power supply to second microcomputer 12B2 is detected. Since the steps in the second fault detection processing are similar to those in the first fault detection processing, the second fault detection processing will be described briefly.

In step S31, second microcomputer 12B2 determines whether current detection value I is more than or equal to predetermined positive value $I_2$. If second microcomputer 12B2 determines that current detection value I is more than or equal to predetermined positive value $I_2$ (YES), second microcomputer 12B2 performs step S32. In step S32, second microcomputer 12B2 determines (detects) that an open fault has occurred in second GND harness HB. In contrast, if second microcomputer 12B2 determines that current detection value I is less than predetermined positive value $I_2$ (NO), second microcomputer 12B2 performs step S35.

In step S33, as in the above step S12, second microcomputer 12B2 outputs, to second power supply relay 19B, a relay control signal (off control signal) for setting second power supply relay 19B to the off state, as the fault processing for second GND harness HB. In step S34, as in the above step S13, second microcomputer 12B2 stops outputting the switching control signals to second drive circuit 12B3, as the fault processing for second GND harness HB.

In step S35, second microcomputer 12B2 determines whether current detection value I is less than or equal to predetermined negative value $I_1$. If second microcomputer 12B2 determines that current detection value I is less than or equal to predetermined negative value (YES), second microcomputer 12B2 performs step S36. In step S36, second microcomputer 12B2 determines (detects) that an open fault has occurred in first GND harness HA. In contrast, if second microcomputer 12B2 determines that current detection value I is more than predetermined negative value $I_1$ (NO), second microcomputer 12B2 performs step S37. In step S37, second microcomputer 12B2 determines (detects) that first and second GND harnesses HA and HB are in normal operation.

With EPS control apparatus 2a according to the second example, as in the first example, the flow of a return current from one system in which a corresponding GND harness malfunctions to a corresponding GND harness in the other system in EPS system 100 can be prevented. Thus, even when the current capacity of the individual GND harness in the redundant configuration is reduced to half of the current capacity of the individual GND harness in a non-redundant configuration, the current that flows through a normal GND harness does not easily exceed the current capacity of this GND harness. That is, since the normal GND harness is not overheated, occurrence of a "concurrent fault" can be prevented. In addition, each of first and second microcomputers 12A2 and 12B2 can detect whether an open fault has occurred in any one of first and second GND harnesses HA and HB. Therefore, when any one of first and second microcomputers 12A2 and 12B2 detects the occurrence of an open fault in the GND harness in its own system, this microcomputer 12A2 or 12B2 does not need to transmit information about the fault to the other system via communication line 23.

Figure 17:
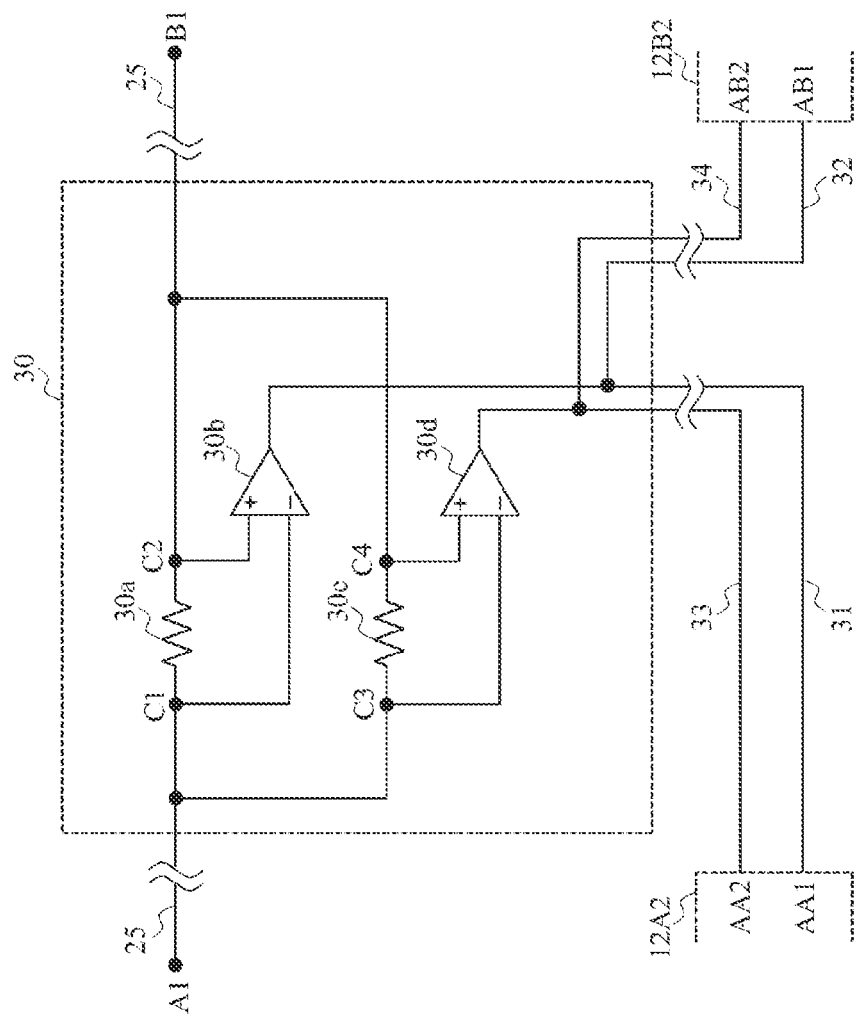
FIG. 17 is a circuit diagram illustrating a current state detection circuit according to a first variation of the EPS control apparatus.

Next, a first variation of EPS control apparatus 2a will be described with reference to FIG. 17. This variation of EPS control apparatus 2a adopts a redundant configuration for constituent elements of current state detection circuit 30. That is, in addition to shunt resistor 30a and amplifier 30b as described above, current state detection circuit 30 includes a shunt resistor 30c corresponding to shunt resistor 30a and an amplifier 30d corresponding to amplifier 30b.

Shunt resistor 30c is connected in parallel to shunt resistor 30a. As is the case with shunt resistor 30a, one end of shunt resistor 30c is connected to connection node A1 and the other end of shunt resistor 30c is connected to connection node B1 via individual connection line 25. Amplifier 30d is connected to connection nodes C3 and C4 located on both sides of shunt resistor 30a. Amplifier 30d has an output terminal connected to an analog input terminal AA2 of first microcomputer 12A2 via a signal line 33, and the output voltage of amplifier 30d is inputted to first microcomputer 12A2. In addition, amplifier 30d has an output terminal connected to an analog input terminal AB2 of second microcomputer 12B2 via a signal line 34, and the output voltage of amplifier 30d is inputted to second microcomputer 12B2.

First microcomputer 12A2 uses its internal Analog/Digital (A/D) converter to convert the output voltage of amplifier 30d, the output voltage being an analog signal, into digital data and to acquire current detection value I of the current that flows through connection line 25. Likewise, second microcomputer 12B2 uses its internal A/D converter to convert the output voltage of amplifier 30d, the output voltage being an analog signal, into digital data and to acquire current detection value I of the current that flows through connection line 25. Thus, each of first and second microcomputers 12A2 and 12B2 acquires current detection value I based on each of the two output voltages outputted from amplifiers 30b and 30d.

In addition, each of first and second microcomputers 12A2 and 12B2 in EPS control apparatus 2a is configured to diagnose whether a fault has occurred in any one of the system including shunt resistor 30a and amplifier 30b and the system including shunt resistor 30c and amplifier 30d.

The first variation of EPS control apparatus 2a adopts a redundant configuration for the constituent elements of current state detection circuit 30, to improve the reliability of current state detection circuit 30. Thus, even when a fault occurs in an element in one system in current state detection circuit 30, the fault detection processing can be performed by using current detection value I acquired from the output voltage of the amplifier in the other system. Thus, the occurrence of an open fault in a GND harness can be detected more certainly.

Figure 18:
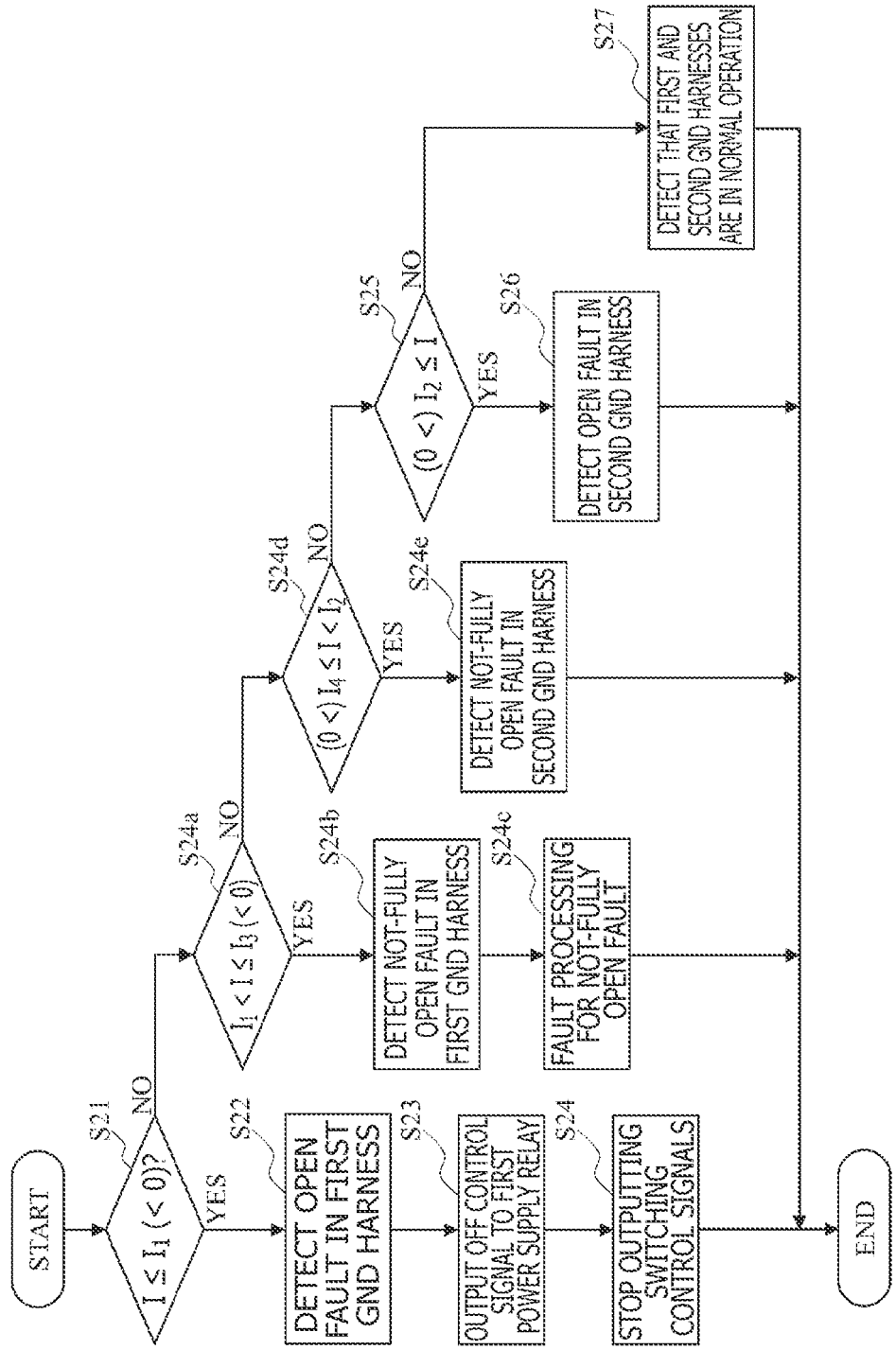
FIG. 18 is a flowchart illustrating an example of first fault detection processing according to a second variation of the EPS control apparatus.

Next, a second variation of EPS control apparatus 2a will be described with reference to FIG. 18. The processing in FIG. 18 includes steps S24a to S24e to be described below, in addition to the steps in the first fault detection processing in FIG. 15. Thus, steps in FIG. 18 that are the same as those in FIG. 15 will be denoted by the same step numbers, and description thereof will be omitted or described briefly.

While a fully open fault, which results in fully electrical disconnection between first in-vehicle battery 6A or second in-vehicle battery 6B and EPS control apparatus 2, could occur in first GND harness HA or second GND harness HB, defective electrical continuity (not-fully open fault) other than this fully electrical disconnection could also occur. A larger return current flows through individual connection line 25 as the degree of failure of first or second GND harness HA or HB changes from a normal state to a fully open fault. Thus, in this second variation, first and second microcomputers 12A2 and 12B2 detect a fully open fault and a not-fully open fault as different faults, based on the magnitude of current detection value I, and perform different fault processing depending on the kind of fault detected.

In step S21, if first microcomputer 12A2 determines that current detection value I is more than predetermined negative value $I_1$ (NO), first microcomputer 12A2 performs step S24a. In step S24a, first microcomputer 12A2 determines whether current detection value I is less than or equal to predetermined negative value $I_3$, which is more than predetermined negative value $I_1$. Predetermined negative value $I_3$ is a maximum value of the current assumed to flow from connection node A1 to connection node B1 through individual connection line 25 when a not-fully open fault has occurred in first GND harness HA.

In step S24a, if first microcomputer 12A2 determines that current detection value I is less than or equal to predetermined negative value $I_3$ (YES), first microcomputer 12A2 performs step S24b. In step S24b, first microcomputer 12A2 determines (detects) that a not-fully open fault has occurred in first GND harness HA. In contrast, if first microcomputer 12A2 determines that current detection value I is more than predetermined negative value $I_3$ (NO), first microcomputer 12A2 performs step S24d.

In step S24c, first microcomputer 12A2 performs fault processing for the not-fully open fault in first GND harness HA. The fault processing for a not-fully open fault in first GND harness HA differs from the fault processing for a fully open fault in first GND harness HA (step S23 and step S24) in the following points. That is, first microcomputer 12A2 continues to output, to first power supply relay 19A, a relay control signal for setting first power supply relay 19A to the on state. In addition, first microcomputer 12A2 adjusts the switching control signals for first inverter 11A without stopping the switching control signals so that the return current flowing to normal second GND harness HB from the first electrical system via individual connection line 25 will not exceed the current capacity of second GND harness HB after the return current from the first electrical system merges with the return current in the second electrical system. Specifically, first microcomputer 12A2 adjusts the switching control signals for first inverter 11A so that the absolute value of current detection value I will not exceed the difference obtained by subtracting the detected value of the return current detected by second current detection element 21B from the current capacity of second GND harness HB. First microcomputer 12A2 may acquire the detected value of the return current detected by second current detection element 21B from second microcomputer 12B2 via communication line 23 or directly from second current detection element 21B. If the switching control signals are pulse width modulation (PWM) signals, first microcomputer 12A2 adjusts a duty that represents a ratio of the on-time of the individual switching element in first inverter 11A.

Why the fault processing as described above is performed will be described below. When a not-fully open fault has occurred in first GND harness HA, a part of the return current from first inverter 11A flows to first GND harness HA. Thus, it is thought that the return current that flows to normal second GND harness HB from first inverter 11A through connection line 25 is less than the return current that flows when a fully open fault has occurred in first GND harness HA. That is, the current that flows to normal second GND harness HB when a not-fully open fault has occurred in first GND harness HA will not easily reach the current capacity of second GND harness HB, as compared with a case where a fully open fault has occurred in first GND harness HA. Thus, when a not-fully open fault has occurred in first GND harness HA, the steering force is assisted as much as the current capacity of normal second GND harness HB allows.

In step S24*d*, first microcomputer 12A2 determines whether current detection value I is less than predetermined positive value $I_2$ and is more than or equal to a predetermined positive value $I_4$. Predetermined positive value $I_4$ is a value less than predetermined positive value $I_2$ and is a minimum value of the current assumed to flow from connection node B1 to connection node A1 via individual connection line 25 when a not-fully open fault has occurred in second GND harness HB. When the first electrical system and the second electrical system have equal electrical characteristics, predetermined positive and negative values $I_4$ and $I_3$ may be designed to have the same absolute value.

In step S24*d*, if first microcomputer 12A2 determines that current detection value I is less than predetermined positive value $I_2$ and is more than or equal to predetermined positive value $I_4$ (YES), first microcomputer 12A2 performs step S24*e*. In step S24*e*, first microcomputer 12A2 determines (detects) that a not-fully open fault has occurred in second GND harness HB. In contrast, if first microcomputer 12A2 determines that current detection value I is not in the above range in step S24*d* (NO), first microcomputer 12A2 performs step S25.

While not illustrated, as the second variation of EPS control apparatus 2*a*, the second fault detection processing in FIG. 16 may include the detection of a not-fully open fault in first GND harnesses HA, the detection of a not-fully open fault in second GND harnesses HB, and the fault processing for a not-fully open fault in second GND harness HB.

In the second variation of EPS control apparatus 2*a*, first and second microcomputers 12A2 and 12B2 can detect a fully open fault and a not-fully open fault as different faults, based on the magnitude of current detection value I and can perform different fault processing depending on the kind of fault detected.

The above first example may be configured to detect a not-fully open fault in any one of first and second GND harnesses HA and HB, by suitably setting junction saturation voltages of first to fourth switch elements 24*b*, 24*c*, 24*e*, and 24*f*. Specifically, for first to fourth switch elements 24*b*, 24*c*, 24*e*, and 24*f*, smaller junction saturation voltages than those used for detecting an open fault are selected. In this way, before a fully open fault occurs in any one of first and second GND harnesses HA and HB, the fault processing can be performed.

In the above second example, the fault processing for a not-fully open fault in first GND harness HA and the fault processing for a fully open fault in first GND harness HA are differentiated. However, the same processing may be performed as the fault processing for a not-fully open fault in first GND harness HA and the fault processing for a fully open fault in first GND harness HA. That is, first microcomputer 12A2 may adjust the switching control signals for first inverter 11A so that the absolute value of current detection value I will not exceed the difference obtained by subtracting the detected value of the return current detected by second current detection element 21B from the current capacity of second GND harness HB.

In the above first and second examples, if fully open faults or not-fully open faults having the same degree of failure occur in both of first and second harnesses HA and HB, the following situation could occur. That is, even if first and second power supply relays 19A and 19B remain in the on state, the return currents in the first and second electrical systems do not occur. Thus, no return current flows from one system to the other system via individual connection line 25. In this case, since little potential difference occurs across each of resistors 24*a* and 24*d* in current state detection circuit 24, each of first to fourth switch elements 24*b*, 24*c*, 24*e*, and 24*f* in current state detection circuit 24 does not change from the off state. In addition, since little potential difference occurs across each of shunt resistors 24*a* and 24*d* in current state detection circuit 30, current detection value I is very small. Thus, first and second microcomputers 12A2 and 12B2 determine that first and second harnesses HA and HB are in normal operation and cannot detect that the fully open faults or not-fully open faults having the same degree of failure have occurred in both of first and second harnesses HA and HB.

To address this situation, first and second microcomputers 12A2 and 12B2 may be configured to operate as follows when both of first detection signal and second detection signal represent "HIGH" or when current detection value I is very small. That is, first microcomputer 12A2 compares the detected value of the first motor current detected by first current detection element 21A with the first target current value, and second microcomputer 12B2 compares the detected value of the second motor current detected by second current detection element 21B with the second target current value. If the detected values of the first and second motor currents continuously deviates from the target current values, first and second microcomputers 12A2 and 12B2 can estimate that fully open faults or not-fully open faults having the same degree of failure have occurred in first and second harnesses HA and HB.

In addition, in the above first and second examples, current state detection circuits 24 and 30 are located on their respective connection lines 25, not on the above short circuit paths. This is because, if a return current flows through the short circuit path, first and second control circuits 12A and 12B are affected by noise or the like and malfunction easily. However, when such impact caused by noise or the like on first and second control circuits 12A and 12B is negligible, current state detection circuits 24 and 30 may be installed on the above short circuit paths, without using connection lines 25.

The technical concepts of the individual examples may be suitably combined as long as inconsistency is not caused. In addition, while the contents of the present invention have specifically been described with reference to the above examples, it is obvious that a person skilled in the art may adopt various kinds of variations as follows, based on the basic technical concepts and teaching of the present invention.

EPS system 100 may be configured to adopt a redundant configuration for three or more electrical systems. In this case, power is supplied from each of the three or more in-vehicle batteries to motor 1 via EPS control apparatus 2. For example, when EPS system 100 has a redundant configuration for three electrical systems, an individual drive system negative line in an individual electrical system connects the negative bus of a corresponding inverter and a corresponding negative connector in each electrical system, and these drive system negative lines are mutually connected among the three electrical systems. Thus, three connection lines 25 are used. Current state detection circuit 24 or 30 is installed on each of three connection lines 25 and is used for detecting the current states of installed connection lines 25.

While npn bipolar transistors are used as first to fourth switch elements 24b, 24c, 24e, and 24f in current state detection circuit 24, elements of a different kind, each of which is able to perform a switching operation depending on the potential difference across resistor 24a or 24d, may alternatively be used. For example, MOSFETs may be used as first and second switch elements 24b and 24c. In sum, any current state detection circuit 24, which outputs an individual detection signal whose potential state changes depending on the magnitude of the current that flows through connection line 25, may be used.

In addition, shunt resistors 30a and 30c and amplifiers 30b and 30d are used in current state detection circuit 30. However, in place of these elements, any other elements, which enable outputting of a signal based on the magnitude of the current that flows through connection line 25, may alternatively be used.

The electronic control apparatus and fault detection method thereby according to the present invention are applicable not only to EPS control apparatuses 2 and 2a in EPS system 100 but also to any other systems in which inverters, control circuits, and external power supplies are redundant and a common ground is used for the redundant control circuits.

REFERENCE SYMBOL LIST 1 motor
2, 2a EPS control apparatus
6A, 6B in-vehicle battery
11A, 11B inverter
12A, 12B control circuit
12A2, 12B2 microcomputer
14A, 14B negative connector
17A, 17B drive system negative line
18A, 18B control system negative line
19A, 19B power supply relay
23 control system common ground
24, 30 current state detection circuit
25 connection line
62A, 62B negative power supply line
CA, CB winding set
LAn, LBn negative bus of inverter

The invention claimed is:

1. An electronic control apparatus having a plurality of electrical systems, each of which is connected to a different external power supply, the electronic control apparatus comprising:
   an inverter that is included in each of the electrical systems and that drives, among a plurality of separate winding sets of a motor, a predetermined winding set in the corresponding electrical system;
   a control circuit that is included in each of the electrical systems and that controls the inverter in the corresponding electrical system;
   a control system common ground to which the control circuits in the electrical systems are commonly connected;
   a connector that is included in each of the electrical systems and that connects a control system negative line from the control system common ground and a drive system negative line from a negative bus of the corresponding inverter with a negative power supply line from the corresponding external power supply;
   a connection line that mutually connects the drive system negative lines between the electrical systems, the connection line provided apart from the control system common ground; and
   a current state detection circuit that is installed on the connection line and that detects current states of the connection line,
   wherein, in each electrical system, the corresponding control circuit detects, based on the current state, whether an open fault has occurred in the corresponding connector or negative power supply line in the corresponding electrical system,
   wherein, when the control circuit detects occurrence of the open fault, the control circuit limits control on the corresponding inverter in the corresponding electrical system, and when the control circuit does not detect occurrence of the open fault, the control circuit continues control on the corresponding inverter in the corresponding electrical system, and
   wherein the connection line is configured to have lower impedance than a short circuit path by which connectors between different electrical systems are short-circuited, the short circuit path being formed by the control system negative lines and the control system common ground.

2. The electronic control apparatus according to claim 1, wherein the current state detection circuit outputs a first detection signal that changes between two potential levels based on presence or absence of a first current state in which a current flows from a first electrical system to a second electrical system through the connection line between the electrical systems and a second detection signal that changes between two potential levels based on presence or absence of a second current state in which a current flows from the second electrical system to the first electrical system through the connection line between the electrical systems, and
wherein the control circuit in the first electrical system detects whether the open fault has occurred, based on a potential level of the first detection signal, and the control circuit in the second electrical system detects whether the open fault has occurred, based on a potential level of the second detection signal.

3. The electronic control apparatus according to claim 2, wherein, when the first current state occurs, the current state detection circuit changes the potential level of the first detection signal and maintains the potential level of the second detection signal, and
wherein, when the second current state occurs, the current state detection circuit changes the potential level of the second detection signal and maintains the potential level of the first detection signal.

4. The electronic control apparatus according to claim 2, wherein the control circuit in the first electrical system further detects whether an open fault has occurred in the connector or the negative power supply line in the second electrical system, based on a potential state of the second detection signal, and
wherein the control circuit in the second electrical system further detects whether an open fault has occurred in the connector or the negative power supply line in the first electrical system, based on a potential state of the first detection signal.

5. The electronic control apparatus according to claim 1, wherein the current state detection circuit outputs a current detection signal whose potential level continuously changes based on a magnitude of a current that flows through the connection line between the electrical systems, and the individual control circuit detects whether the open fault has occurred based on a detected current value acquired from the current detection signal.

6. The electronic control apparatus according to claim 1, wherein a constituent element of the current state detection circuit is redundantly used.

7. The electronic control apparatus according to claim 1, wherein each electrical system further includes a power supply relay capable of cutting off power supply to the corresponding inverter, and
wherein, when the control circuit detects occurrence of the open fault, the control circuit outputs a control signal for cutting off the power supply to the corresponding inverter in the corresponding electrical system to the power supply relay and stops control on the inverter in the corresponding electrical system.

8. A fault detection method by an electronic control apparatus including: a plurality of electrical systems, each of which is connected to a different external power supply; an inverter that is included in each of the electrical systems and that drives, among a plurality of separate winding sets of a motor, a predetermined winding set in the corresponding electrical system; a control circuit that is included in each of the electrical systems and that controls the inverter in the corresponding electrical system; a control system common ground to which the control circuits in the electrical systems are commonly connected; a connector that is included in each of the electrical systems and that connects a control system negative line from the control system common ground and a drive system negative line from a negative bus of the corresponding inverter with a negative power supply line from the corresponding external power supply; a connection line that mutually connects the drive system negative lines between the electrical systems, the connection line provided apart from the control system common ground; and a current state detection circuit that is installed on the connection line and that detects current states of the connection line, the fault detection method comprising:
causing the control circuit in each electrical system to detect, based on the current state, whether an open fault has occurred in the corresponding connector or negative power supply line in the corresponding electrical system;
causing the control circuit to limit control on the corresponding inverter in the corresponding electrical system when the control circuit detects occurrence of the open fault; and
causing the control circuit to continue control on the corresponding inverter in the corresponding electrical system when the control circuit does not detect occurrence of the open fault,
wherein the connection line is configured to have lower impedance than a short circuit path by which connectors between different electrical systems are short-circuited, the short circuit path being formed by the control system negative lines and the control system common ground.

\* \* \* \* \*